(12) United States Patent
Iwamoto

(10) Patent No.: US 11,462,004 B2
(45) Date of Patent: Oct. 4, 2022

(54) OBJECT IDENTIFICATION DEVICE, OBJECT IDENTIFICATION METHOD, CALCULATION DEVICE, SYSTEM, AND RECORDING MEDIUM

(71) Applicant: NEC Corporation, Tokyo (JP)

(72) Inventor: Kota Iwamoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 355 days.

(21) Appl. No.: 16/623,641

(22) PCT Filed: Jul. 7, 2017

(86) PCT No.: PCT/JP2017/024924
§ 371 (c)(1),
(2) Date: Dec. 17, 2019

(87) PCT Pub. No.: WO2019/008735
PCT Pub. Date: Jan. 10, 2019

(65) Prior Publication Data
US 2021/0287028 A1 Sep. 16, 2021

(51) Int. Cl.
*G06V 10/98* (2022.01)
*G06T 7/37* (2017.01)
(Continued)

(52) U.S. Cl.
CPC ........... *G06V 10/98* (2022.01); *G06K 9/6232* (2013.01); *G06T 7/37* (2017.01); *G06V 10/42* (2022.01); *G06V 20/00* (2022.01)

(58) Field of Classification Search
CPC ..... G06V 10/56; G06V 20/647; G06V 40/161
See application file for complete search history.

(56) References Cited

U.S. PATENT DOCUMENTS 7,783,084 B2 8/2010 Imagawa et al.
9,025,816 B2 5/2015 Naito et al.
(Continued)

FOREIGN PATENT DOCUMENTS

JP 2001-014465 A 1/2001
JP 2006-228199 A 8/2006
(Continued)

OTHER PUBLICATIONS

International Search Report corresponding to PCT/JP2017/024924, dated Sep. 26, 2017 (3 pages).
(Continued)

*Primary Examiner* — Ming Wu

(57) ABSTRACT

Provided is a technology to identify the number of objects to be identified for each packaging unit with a high degree of accuracy. This object identification device comprises: a comparison unit which compares a captured image with an identification image for identifying objects; and a determination means which, if a plurality of objects are identified as being contained within the captured image, determines whether the plurality of identified objects are articles bundled together in accordance with predetermined conditions, based on a first parameter which represents the geometrical relationship between a first position in a first space, and a second position corresponding to the first position in a second space which represents the image space if the plurality of articles represented by the identification image are bundled together, and a second parameter which represents the geometrical relationship between the first position and a third relationship corresponding to the first position.

15 Claims, 18 Drawing Sheets

(51) Int. Cl.
*G06K 9/62* (2022.01)
*G06V 10/42* (2022.01)
*G06V 20/00* (2022.01)

(56) References Cited

U.S. PATENT DOCUMENTS

| | | | | |
|---|---|---|---|---|
| 2007/0188787 A1* | 8/2007 | Aiso | ............ | H04N 1/00188 |
| | | | | 358/1.9 |
| 2016/0173731 A1* | 6/2016 | Mishima | ............ | H04N 1/00251 |
| | | | | 358/1.14 |
| 2016/0182769 A1* | 6/2016 | Choi | ............ | G06T 7/215 |
| | | | | 348/169 |
| 2016/0191505 A1* | 6/2016 | Frank | ............ | G06V 40/171 |
| | | | | 726/7 |
| 2016/0350927 A1* | 12/2016 | Ma | ............ | G06T 5/20 |

FOREIGN PATENT DOCUMENTS

| | | |
|---|---|---|
| JP | 2007-219765 A | 8/2007 |
| JP | 2013-054673 A | 3/2013 |

OTHER PUBLICATIONS

Written Opinion corresponding to PCT/JP2017/024924, dated Sep. 26, 2017 (5 pages).

* cited by examiner

Fig.4

| IMAGE NUMBER | OBJECT NAME | DATABASE IMAGE |
|---|---|---|
| P401 | XXX | 44A |
| P402 | YYY | 44B |
| ... | ... | ... |

Fig.6

| TRANSFORMATION SOURCE IMAGE NUMBER | TRANSFORMATION DESTINATION POSITION NUMBER | PARAMETER |
|---|---|---|
| P401 | B401A | $\begin{bmatrix} h_{a11} & h_{a12} & h_{a13} \\ h_{a21} & h_{a22} & h_{a23} \\ h_{a31} & h_{a32} & h_{a33} \end{bmatrix}$ |
| P401 | B401B | $\begin{bmatrix} h_{b11} & h_{b12} & h_{b13} \\ h_{b21} & h_{b22} & h_{b23} \\ h_{b31} & h_{b32} & h_{b33} \end{bmatrix}$ |
| P401 | B401C | $\begin{bmatrix} h_{c11} & h_{c12} & h_{c13} \\ h_{c21} & h_{c22} & h_{c23} \\ h_{c31} & h_{c32} & h_{c33} \end{bmatrix}$ |
| P401 | B401D | $\begin{bmatrix} h_{d11} & h_{d12} & h_{d13} \\ h_{d21} & h_{d22} & h_{d23} \\ h_{d31} & h_{d32} & h_{d33} \end{bmatrix}$ |
| ... | ... | ... |

| OBJECT NAME | PACKING UNIT | QUANTITY |
|---|---|---|
| XXX | 2 × 2 | 1 |
| ... | ... | ... |

OBJECT IDENTIFICATION DEVICE, OBJECT IDENTIFICATION METHOD, CALCULATION DEVICE, SYSTEM, AND RECORDING MEDIUM

CROSS-REFERENCE TO RELATED APPLICATIONS

The present application is based upon and claims the benefit of the priority of International Application No. PCT/JP2017/024924, entitled OBJECT IDENTIFICATION DEVICE, OBJECT IDENTIFICATION METHOD, CALCULATION DEVICE, SYSTEM, AND RECORDING MEDIUM, filed on Jul. 7, 2017, the disclosure of which is incorporated herein in its entirety. Embodiments of this invention relate to an object identification device, an object identification method, a calculation device, a system, and a recording medium.

BACKGROUND ART

As a method of enhancing recognition precision, increasing an amount of information in a database used for recognition is disclosed (for example, PTL 1). Further, a technology of estimating a position and an attitude of a three-dimensional object, based on a two-dimensional image, by use of a database is disclosed (for example, PTL 2). The database is generated by use of images in which an object for reference is captured from a plurality of different viewpoints.

CITATION LIST

Patent Literature

PTL 1: Japanese Unexamined Patent Application Publication No. 2001-014465
PTL 2: Japanese Unexamined Patent Application Publication No. 2007-219765

SUMMARY OF INVENTION

Technical Problem

A predetermined number of articles may be grouped together and packed as one object. When an image of single article is registered as for identification (database image) in identification of such grouped-together and packed articles, individual articles may be identified, but whether the object is a bundle of grouped articles or single article may not be determined accurately.

Further, when an image of a plurality of articles grouped together is set as one object in a database image, the image is checked against database images prepared for each of grouping units, and as varieties of grouping unit increase, a number of checking process increases. This causes overload of check processing on an object identification device, thus not practical.

The present disclosure has been made in view of the aforementioned problem, and one of the objects of the present disclosure is to provide a technology capable of precisely identifying a number of objects to be identified for each packing unit.

Solution to Problem

One embodiment of the present disclosure is an object identification device comprising:

check means for checking a captured image against an identification image for identifying objects; and
determination means for, in a case where a plurality of objects are identified to be included in the captured image, determining whether or not the identified objects are articles grouped together under a predetermined condition,
by using
a first parameter indicating a geometric relation between a first position in a first space being an image space of the identification image and a second position corresponding to the first position in a second space, the second space representing an image space in a case where objects indicated by the identification image are articles grouped together under the predetermined condition, and
a second parameter indicating a geometric relation between the first position and a third position corresponding to the first position on the captured image.

One embodiment of the present disclosure is an object identification method comprising:

checking a captured image against an identification image for identifying objects; and
in a case where a plurality of objects are identified to be included in the captured image, determining whether or not the identified objects are articles grouped together under a predetermined condition,
by using
a first parameter indicating a geometric relation between a first position in a first space being an image space of the identification image and a second position corresponding to the first position in a second space, the second space representing an image space in a case where objects indicated by the identification image are articles grouped together under the predetermined condition, and
a second parameter indicating a geometric relation between the first position and a third position corresponding to the first position on the captured image.

One embodiment of the present disclosure is a calculation device comprising:

extraction means for extracting feature information indicating a feature of an object, from an identification image for identifying the object; and
calculation means for, in a case where a plurality of objects are identified on a captured image by a check using the identification image, calculating a first parameter used along with a second parameter when determining whether or not the plurality of identified objects are articles grouped together under a predetermined condition, based on the extracted feature information,
the first parameter indicating a geometric relation between a first position in a first space being an image space of the identification image and a second position related to the first position in a second space representing an image space when a plurality of objects indicated by the identification image are articles grouped together under the predetermined condition, and
the second parameter indicating a geometric relation between the first position and a third position related to the first position on the captured image.

Further, a system including the aforementioned object identification device and calculation device also falls under the category of the present disclosure.

A computer program providing each of the aforementioned devices or the aforementioned method by a computer, and a computer readable non-transitory recording medium storing the computer program also fall under the category of the present disclosure.

Advantageous Effects of Invention

The present disclosure can precisely identify a number of objects to be identified for each packing unit.

BRIEF DESCRIPTION OF DRAWINGS

FIG. 4 is a diagram illustrating an example of image information including database images stored in an image storage.

FIG. 6 is a diagram illustrating an example of parameter information stored by a Parameter storage.

EXAMPLE EMBODIMENT

First Example Embodiment

Figure 1:
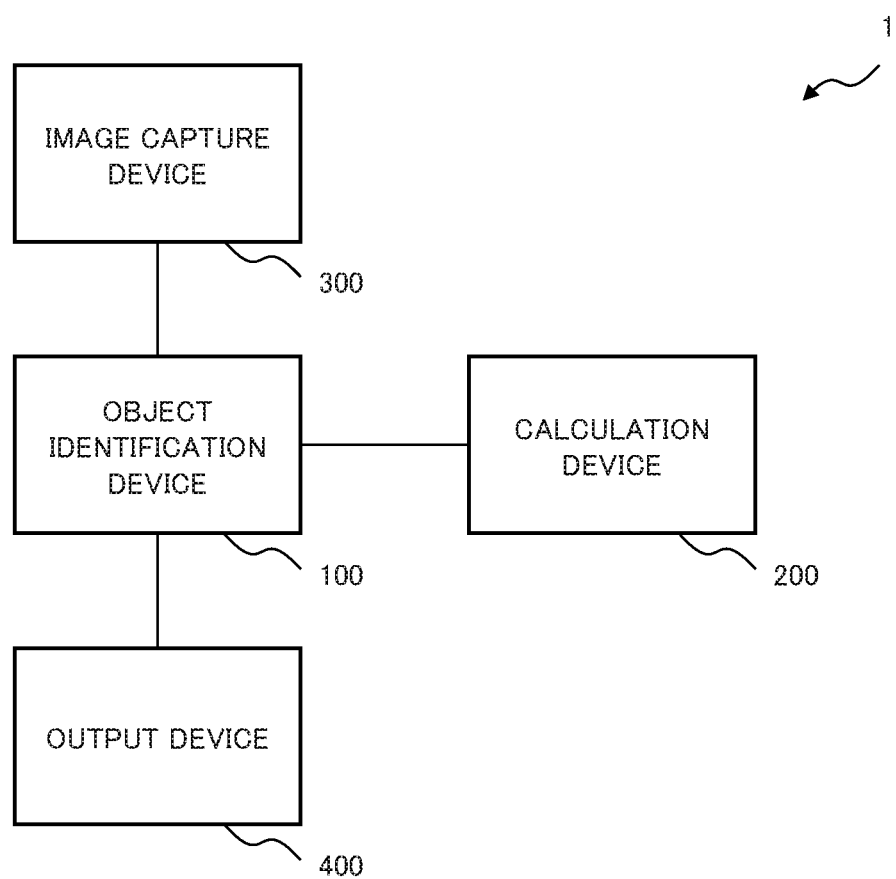
FIG. 1 is a diagram illustrating an example of an overall configuration of a system according to a first example embodiment.

A first example embodiment of the present disclosure will be described with reference to drawings. FIG. 1 is a diagram illustrating an example of an overall configuration of system 1 according to the present example embodiment. System 1 illustrated in FIG. 1 includes object identification device 100, calculation device 200, image capture device 300, and output device 400. FIG. 1 illustrates a configuration characteristic of the present disclosure, and it goes without saying that system 1 may include a device not illustrated in FIG. 1. Further, the devices illustrated in FIG. 1 may be configured to be combined with one another. For example, object identification device 100 and calculation device 200 may be integrated with each other, or object identification device 100 and image capture device 300 may be integrated with each other.

Object identification device 100 is mutually and communicably connected to calculation device 200, image capture device 300, and output device 400. A communication means between the devices may be either of wired and wireless communication, or may be communication through any of a mobile communication network, a public network, a local area network (LAN), and a wide area network (WAN). Thus, various methods may be considered as the communication method between the devices.

Image capture device 300 captures an image including an object being an image capture target. For example, image capture device 300 is provided by a camera including a lens and an imaging element. For example, image capture device 300 is provided by a digital camera or a web camera. Image capture device 300 supplies a captured image to object identification device 100. Image capture device 300 may store a captured image inside image capture device 300 or in a storage device different from object identification device 100. In this case, object identification device 100 may acquire a captured image from a location where the captured image is stored.

Output device 400 performs output based on a control signal from object identification device 100. For example, output device 400 may be a display device such as a display or a terminal device including a display. Further, without being limited to the above, output device 400 may be a speaker, a printer, or a device outputting information included in a received signal as a file.

Figure 2:
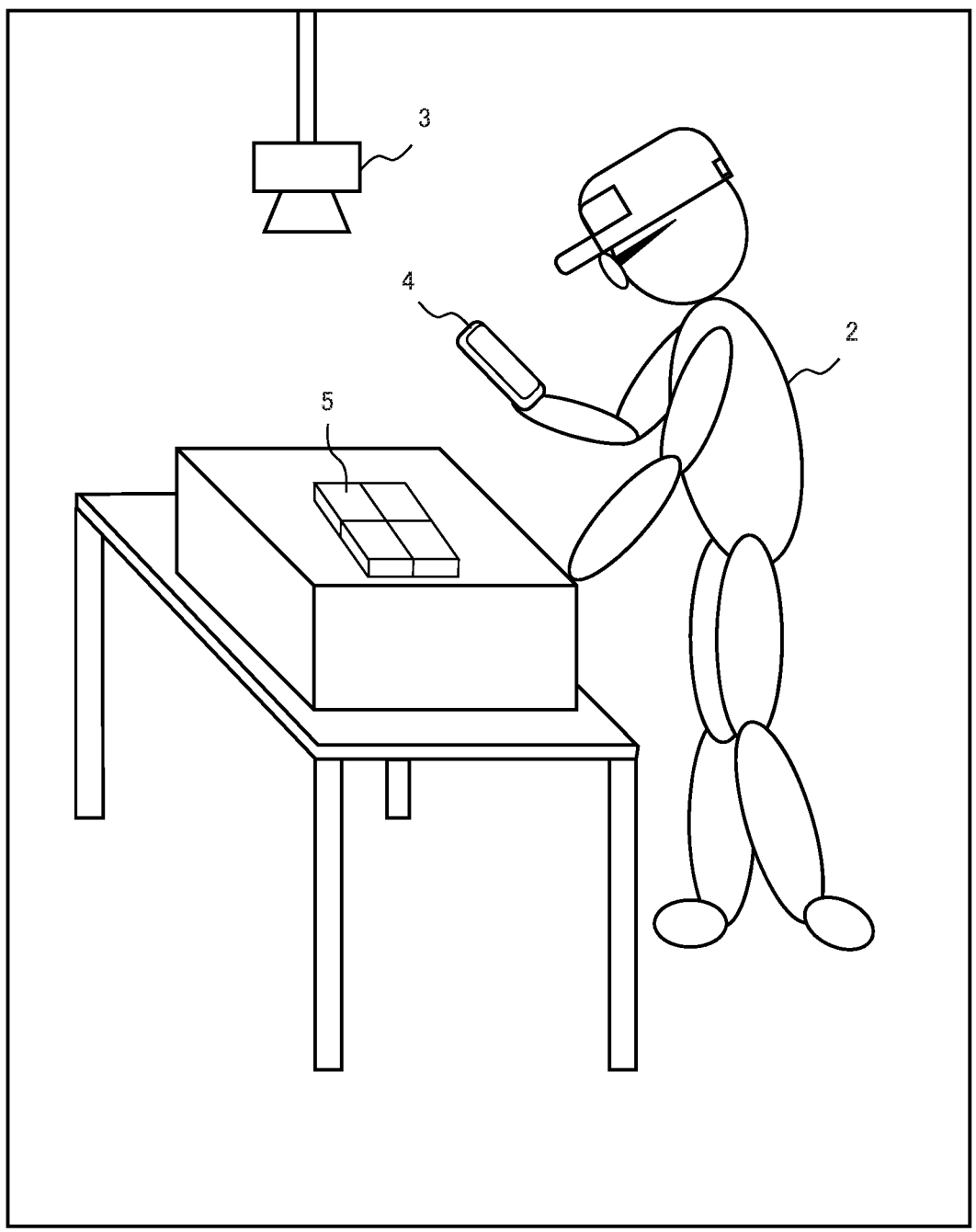
FIG. 2 is a diagram for illustrating an example of a use scene in which the system according to the first example embodiment is used.

FIG. 2 is a diagram for illustrating an example of a use scene in which system 1 according to the present example embodiment is used. In FIG. 2, camera 3 is illustrated as an example of image capture device 300. Camera 3 is installed at a position allowing image capture of an object 5 (a bundle or an article; a four-article bundle is shown in FIG. 2), as an example, grouping together a plurality of the same type of article packed in a predetermined container, that is, an article constitutes a portion of a bundle. Further, in FIG. 2, mobile terminal 4 is illustrated as an example of output device 400.

The aforementioned predetermined container may contain an article in a state of a plurality of articles not being bundled together.

A captured image including object 5 captured by camera 3 is transmitted to object identification device 100. Object identification device 100 determines whether object 5 is an article or a bundle, based on an identification result of object 5 and a parameter calculated by calculation device 200, and further determines a number of object 5 for each packing unit. Specifically, object identification device 100 determines a number of articles when object 5 are articles or determines a number of bundles when object 5 are bundles. Then, object identification device 100 outputs the determination result to mobile terminal 4. Consequently, operator 2 can check the determination result displayed on a screen on mobile terminal 4.

Figure 3:
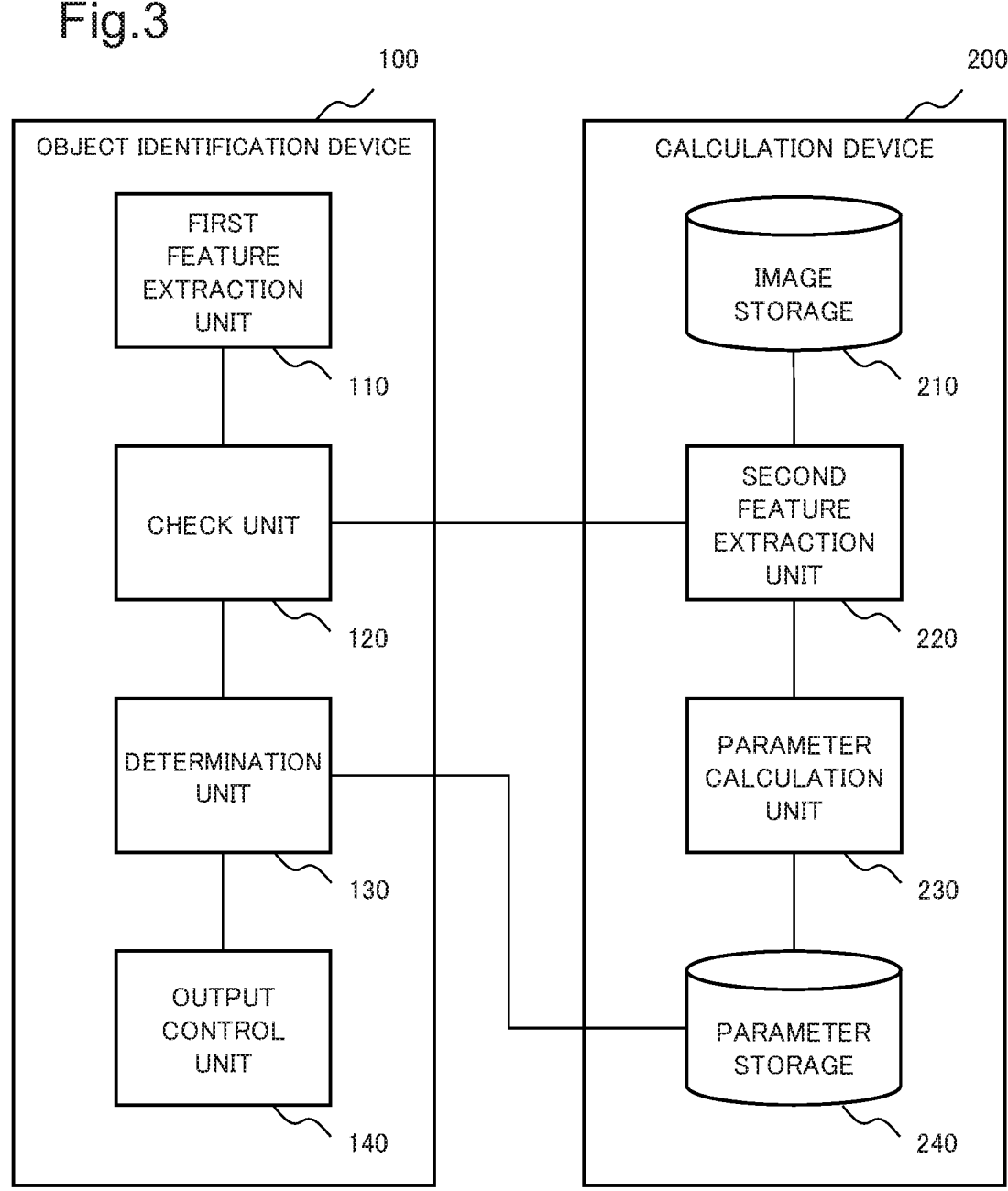
FIG. 3 is a functional block diagram illustrating an example of functional configurations of an object identification device and a calculation device that are included in the system according to the first example embodiment.

Next, configurations of object identification device 100 and calculation device 200 that are included in system 1 will be described with reference to FIG. 3. Object identification device 100 receives a captured image captured by image capture device 300, checks objects included in the captured image, and determines a number of articles for each packing unit. Object identification device 100 includes first feature extraction unit 110, check unit 120, determination unit 130, and output control unit 140.

Calculation device 200 stores an image for identification (also referred to as a database image) for identifying an object, the image being used when object identification device 100 makes a check on an object included in a captured image. Further, calculation device 200 calculates a parameter used when object identification device 100 determines a number of articles for each packing unit. Calculation device 200 includes image storage 210, second feature extraction unit 220, parameter calculation unit 230, and Parameter storage 240.

First, each unit in calculation device 200 will be described. Image storage 210 stores a database image for identifying an object. A database image is used when making an object is checked against a captured image. An example of a database image stored by image storage 210 is illustrated in FIG. 4. FIG. 4 is a diagram illustrating an example of image information 41 including a database image and being stored in image storage 210. As illustrated in FIG. 4, image information 41 includes image number 42, object name 43, and database image 44. Image number 42 is an identifier for identifying database image 44. Object name 43 is a name of an object represented by database image 44. Database image 44 is a captured image in which an image of an object indicated by object name 43 is captured.

As illustrated in FIG. 4, image information 41 includes database image 44A being a captured image in which an image of an object with object name 43 "XXX" is captured. Further, image information 41 includes database image 44B being a captured image in which an image of an object with object name 43 "YYY" is captured. While it is assumed in the present example embodiment that image information 41 includes one captured image for one object as database image 44, a plurality of captured images may be included for one object as database images 44.

Furthermore, database image 44 may be an image generated as an image for checking instead of an actually captured image. Further, database image 44 may be an image captured by image capture device 300 or an image acquired by another method. Further, image storage 210 may be provided by a storage device separate from calculation device 200.

Second feature extraction unit 220 extracts a feature value from each database image 44 stored in image storage 210 and extracts (detects) a feature point having the feature value. Information related to a feature value and a feature point that are extracted by second feature extraction unit 220 is hereinafter referred to as feature information.

Second feature extraction unit 220 may extract feature information by any method, and the method is not particularly limited. Second feature extraction unit 220 may extract feature information used when object identification device 100 makes a check. Second feature extraction unit 220 stores the extracted feature information into the own unit or a storage such as image storage 210, along with information (for example, image number 42) indicating database image 44 being an extraction source. Aforementioned image storage 210 may store feature information extracted by second feature extraction unit 220, in addition to database image 44 or in place of database image 44. Further, second feature extraction unit 220 may extract a plurality of types of feature values as feature information. Second feature extraction unit 220 supplies the extracted feature information to parameter calculation unit 230, along with information (for example, image number 42) indicating database image 44 being an extraction source.

Figure 5:
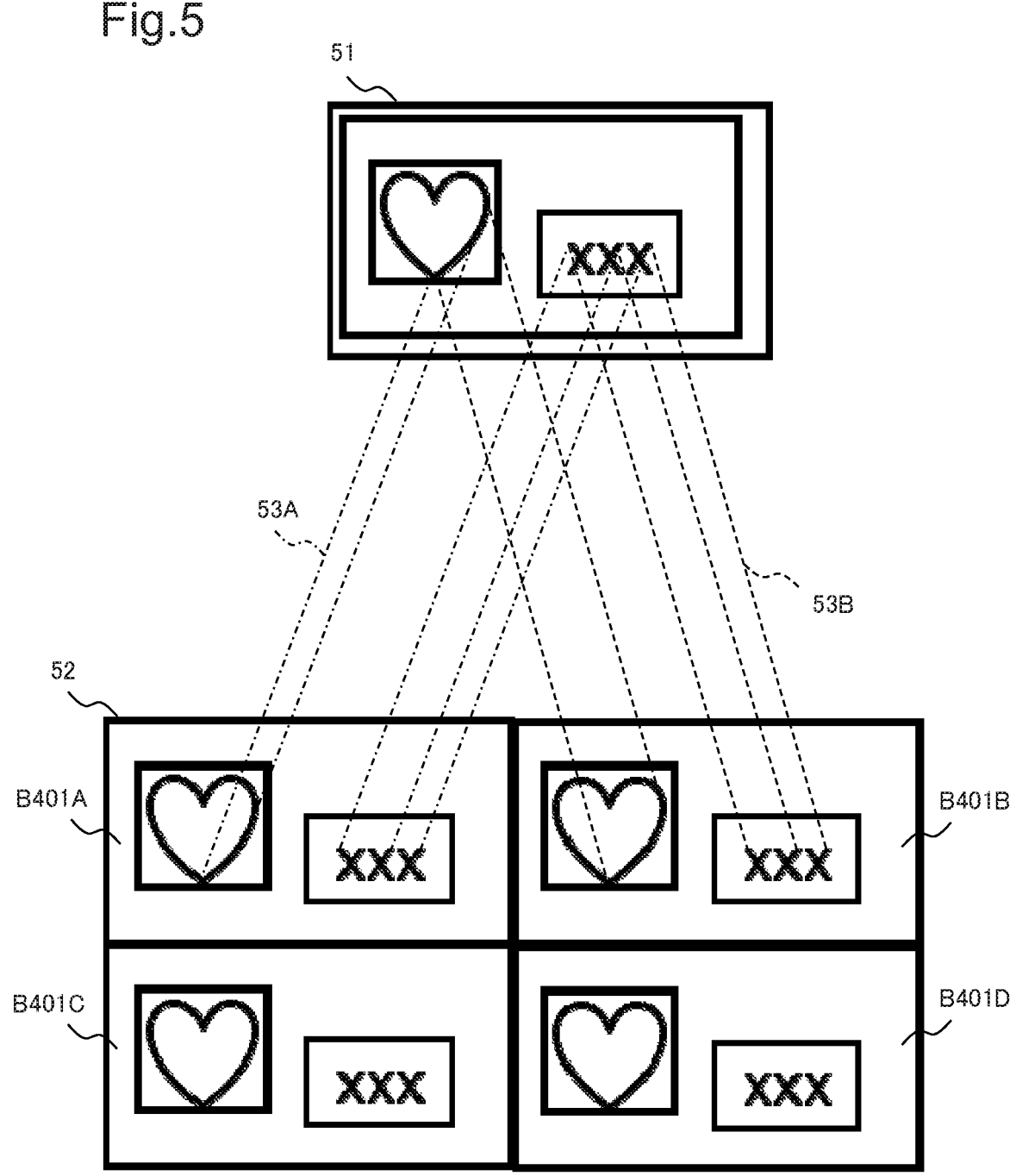
FIG. 5 is a diagram for illustrating parameter calculation by a parameter calculation unit.

Parameter calculation unit 230 calculates a parameter (first parameter) indicating a geometric relation between database images, by use of feature information extracted by second feature extraction unit 220. FIG. 5 is a diagram for illustrating parameter calculation by parameter calculation unit 230.

Database image 51 illustrated in the upper part of FIG. 5 is database image 44A with image number 42 "P401" illustrated in FIG. 4. Further, bundle image 52 indicating a bundle grouping four articles indicated by database image 51 together is illustrated in the lower part of FIG. 5. The bundle is grouped articles indicated by database image 51 together in the same direction in two rows and two columns. This bundle image 52 may be an image virtually generated based on database image 51 or may be acquired by capturing an image of a bundle grouping articles together, based on a predetermined condition. In the case of the latter, second feature extraction unit 220 or another component may extract feature information from a captured image in which an image of the bundle is captured. It is assumed that the bundle represented by bundle image 52 in FIG. 5 includes a plurality of articles (B401A to B401D).

By use of feature information extracted from database image 51 by second feature extraction unit 220, parameter calculation unit 230 specifies a feature point on bundle image 52 related to each feature point in an image space of database image 51. Dot-and-dash lines 53A and broken lines 53B in FIG. 5 are examples of segments connecting related feature points between database image 51 and bundle image 52. Parameter calculation unit 230 specifies thus related feature points and calculates a parameter indicating a geometric relation between positions of feature points in database image 51 and bundle image 52. For convenience of description, only part of dot-and-dash lines 53A and broken lines 53B are illustrated. In other words, parameter calculation unit 230 also similarly calculates parameters indicating geometric relations between database image 51, and an image of an article B401C part and an image of an article B401D part in bundle image 52, respectively.

An image space of database image 51 is herein referred to as an article image space (first space). Then, a position of a feature point on database image 51 in the article image space is also referred to as a first position. Further, an image space of bundle image 52 is referred to as a bundle image space (second space). Then, a position of a feature point in the bundle image space related to a feature point on database image 51 is also referred to as a second position. In other words, a parameter calculated by parameter calculation unit 230 indicates a geometric relation between a first position and a second position.

For example, when a parameter is assumed to be a homography matrix, parameter calculation unit 230 calculates a homography matrix transforming coordinates in the article image space into coordinates in the bundle image space. Parameter calculation unit 230 calculates a homography matrix for each article included in a bundle represented by bundle image 52. Specifically, parameter calculation unit 230 calculates parameters correspondingly to a number of articles (four in the example illustrated in FIG. 5) included in the bundle represented by bundle image 52.

A parameter is assumed to be a homography matrix in the description of the present example embodiment but is not limited thereto, and may be a transformation factor used in an affine transformation or a parameter used in another transformation formula.

Then, parameter calculation unit 230 stores, into Parameter storage 240, information indicating a database image being a target of parameter calculation, information indicating an article in the bundle image space, and a parameter. The pieces of information and the parameter are associated with one another.

Parameter storage 240 stores a parameter calculated by parameter calculation unit 230 along with information indicating a database image being a target of parameter calculation and information indicating an article in the bundle image space. An example of parameter information including the parameter stored by Parameter storage 240 is illustrated in FIG. 6. As illustrated in FIG. 6, Parameter storage 240 stores parameter information 61.

As illustrated in FIG. 6, parameter information 61 includes transformation source image number 62, transformation destination position number 63, and parameter 64. Transformation source image number 62 is an image number indicating a database image being a source of a geometric transformation. Transformation destination position number 63 is a number indicating a position of an article in a bundle being a destination of a geometric transformation. A position of an article is indicated by a sign given to each of a plurality of articles illustrated in FIG. 5, according to the present example embodiment.

For example, parameter 64 in the first row in parameter information 61 is a homography matrix in a case of transforming coordinates on database image 44A being database image 44 with image number 42 "P401" into coordinates in a region taken up by article B401A at a position indicated by "B401A" in the bundle image space. For convenience of description, parameter 64 in this case is hereinafter denoted as H[P401→B401A]. As described above, transformation destination position number 63 has only to be information indicating a position of an article in a bundle and for example, may be "upper left."

Similarly, H[P401→B401B] is a homography matrix in a case of transforming coordinates on database image 44A with image number 42 "P401" into coordinates in a region taken up by article B401B at a position indicated by "B401B" in the bundle image space. The homography matrix indicates parameter 64 included in the second row in FIG. 6.

Parameter storage 240 may be provided by a storage device separate from calculation device 200. Further, Parameter storage 240 may be integrally configured with image storage 210. Further, Parameter storage 240 may be built into object identification device 100.

Next, object identification device 100 will be described. First feature extraction unit 110 extracts a feature value from a captured image and extracts a feature point having the feature value. First feature extraction unit 110 acquires a captured image from image capture device 300 or a storage device storing the captured image. First feature extraction unit 110 extracts feature information being information about a feature value and a feature point from the acquired captured image. First feature extraction unit 110 may extract feature information by any method, and the method is not particularly limited. First feature extraction unit 110 may extract feature information by a method similar to that by second feature extraction unit 220. When second feature extraction unit 220 extracts a plurality of types of feature values as feature information, first feature extraction unit 110 may extract any type of feature value as feature information. Then, first feature extraction unit 110 supplies the extracted feature information to check unit 120, along with a captured image being an extraction source.

When a captured image acquired by first feature extraction unit 110 is stored in a storage or the like in object identification device 100, first feature extraction unit 110 may supply extracted feature information to check unit 120, along with information indicating a captured image being an extraction source.

Check unit 120 checks a captured image against a database image by use of feature information extracted by first feature extraction unit 110 and feature information extracted by second feature extraction unit 220. Then, check unit 120 supplies the check result to determination unit 130. For example, a check result includes a degree of similarity between a captured image and database image 44, information indicating database image 44, information indicating a related feature point, and a position of the feature point on the captured image. However, the check result is not limited to the above. Further, for example, information indicating database image 44 may be image number 42 or other information. A method of checking performed by check unit 120 is not particularly limited, and any method may be employed.

Determination unit 130 refers to a check result and determines whether or not the check result indicates that a plurality of objects are included in a captured image. When determining that the captured image includes a plurality of objects, based on the check result, determination unit 130 determines whether or not the plurality of objects constitute a bundle grouping some articles together, based on a predetermined condition. The determination is based on parameter 64 (a first parameter) stored in Parameter storage 240 and a second parameter indicating a geometric relation between database image 44 and the captured image.

It is preferable that a second parameter indicating a geometric relation between database image 44 and a captured image be the same as aforementioned parameter 64. A second parameter is assumed to be a homography matrix in the description of the present example embodiment but is not limited thereto. The second parameter may be a transformation factor used in an affine transformation or a parameter used in another transformation formula.

First, determination unit 130 receives a check result from check unit 120. Then, determination unit 130 refers to the check result and determines whether or not a plurality of objects are identified and also the identified plurality of objects indicate the same object. For example, whether the identified plurality of objects indicate the same object may be determined by determining whether or not the objects (articles) have the same name (for example, an object name). Then, when a plurality of objects having the same object name are identified, determination unit 130 acquires, from Parameter storage 240, parameter 64 related to database image 44 related to the object in the captured image. The acquisition is performed by use of information indicating database image 44, the information being included in the check result.

Determination unit 130 determines whether or not the plurality of identified objects constitute a bundle grouping the objects (articles) together, based on a predetermined condition. The determination is made based on acquired parameter 64, and a second parameter indicating a geometric relation between database image 44 and the captured image.

Figure 7:
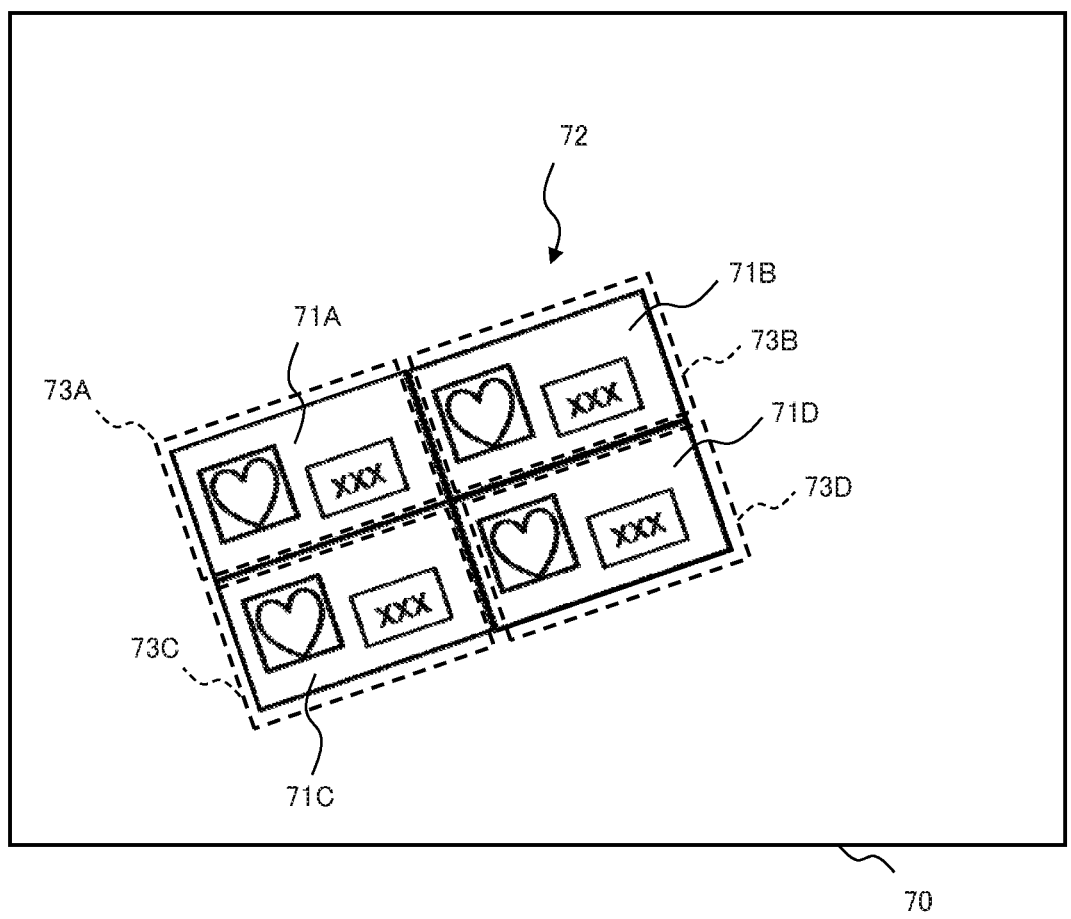
FIG. 7 is a diagram for illustrating determination processing performed by a determination unit.

Determination processing performed by determination unit 130 will be further described with reference to FIG. 4, FIG. 5, and FIG. 7 to FIG. 11. FIG. 7 is a diagram for illustrating the determination processing performed by determination unit 130.

Captured image 70 illustrated in FIG. 7 is an image acquired by capturing an image of four articles (71A to 71D). Four articles (71A to 71D) are grouped together to form bundle 72 in such a way as to be directed in the same direction in two rows and two columns. As illustrated in FIG. 7, captured image 70 includes one bundle 72. Four articles (71A to 71D) are herein referred to as articles 71 when the articles are not distinguished or generically named.

Check unit 120 checks captured image 70 illustrated in FIG. 7 against database image 44 by use of feature information extracted from database image 44 and feature information extracted from captured image 70. It is assumed that, from the acquired check result, a check result that four of the article represented by database image 44A illustrated in FIG. 4 appear in captured image 70 is consequently acquired. In other words, the check result tells that four articles 71 appear in captured image 70.

From the check result, determination unit 130 calculates a parameter (a second parameter described above) indicating a geometric relation between database image 44A and captured image 70. The calculation is performed by use of feature information of database image 44A used for checking by check unit 120 and feature information extracted from captured image 70. The check result tells that four articles (71A to 71D) match database image 44A. Therefore, determination unit 130 calculates a second parameter indicating a geometric relation between a position on database image 44 and a position in a region on a captured image of recognized article 71 related to the position, for each of recognized articles (71A to 71D). In the case of captured image 70 illustrated in FIG. 7, determination unit 130 calculates four second parameters.

A calculation method of a second parameter may be the same as the method performed by parameter calculation unit 230. For example, a homography matrix for transforming coordinates on database image 44 into coordinates on an image of an article 71A part in captured image 70 is hereinafter denoted as H[P401→71A]. A position of a feature point on a captured image related to a feature point on database image 44 is hereinafter also referred to as a third position. In other words, a second parameter calculated by determination unit 130 indicates a geometric relation between a first position and a third position.

Similarly, a homography matrix for transforming coordinates on database image 44 into coordinates on an image of an article 71B part of captured image 70 is denoted as H[P401→71B]. Similarly, a homography matrix related to article 71C is denoted as H[P401→71C], and a homography matrix related to article 71D is denoted as H[P401→71D]. Thus, determination unit 130 calculates second parameters correspondingly to a number of identified articles.

Frame 73A in broken lines illustrated in FIG. 7 is a region on captured image 70 when coordinates on database image 44 are transformed into coordinates on captured image 70 by use of H[P401→71A], the region being indicated by the coordinates. Similarly, frame 73B illustrated in FIG. 7 is a region on captured image 70 when coordinates on database image 44 are transformed into coordinates on captured image 70 by use of H[P401→71B], the region being indicated by the coordinates. Frame 73C is a region on captured image 70 when coordinates on database image 44 are transformed into coordinates on captured image 70 by use of H[P401→71C], the region being indicated by the coordinates. Frame 73D is a region on captured image 70 when coordinates on database image 44 are transformed into coordinates on captured image 70 by use of H[P401→71D], the region being indicated by the coordinates.

Based on the check result, determination unit 130 acquires, from Parameter storage 240, parameter 64 associated with "P401" being image number 42 indicating database image 44A. In this case, determination unit 130 acquires, from Parameter storage 240, parameters 64 in the first to fourth rows being indicated in FIG. 6 and having transformation source image number 62 "P401." As described above, acquired parameters 64 are denoted as H[P401→B401A], H[P401→B401B], H[P401→B401C], and H[P401→B401D] in an order from the first row in FIG. 6.

Then, in order to determine whether or not the plurality of identified objects are articles grouped together based on a predetermined condition, determination unit 130 transforms coordinates on database image 44 into coordinates on a captured image. The transformation is performed by use of the first parameter and the second parameter.

Article 71A (first article) out of four identified articles (71A to 71D) is set as a reference. A reference article may be set arbitrarily and is not particularly limited. Further, in this example, assuming that reference article 71A and other articles (71B to 71D) form a bundle, determination unit 130 performs determination processing by performing a homography transformation, to be described below, on article 71B (second article) positioned adjacently on the right side of article 71A.

Figure 8:
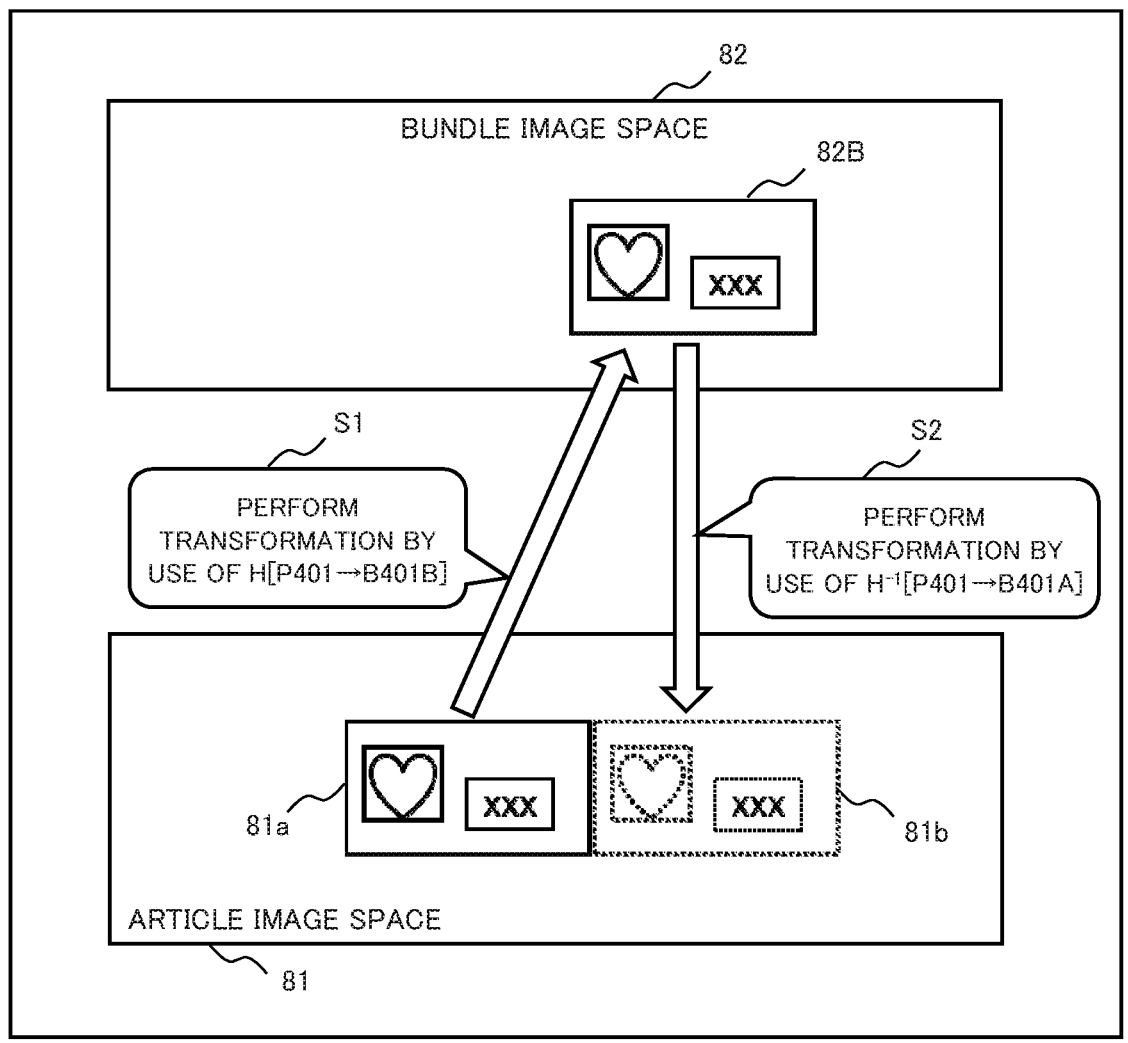
FIG. 8 is a diagram conceptually illustrating a correspondence relation between a bundle image space and an article image space.

First, determination unit 130 transforms coordinates on database image 44 into coordinates in the article image space. FIG. 8 is a diagram conceptually illustrating a correspondence relation between the bundle image space and the article image space.

Article image space 81 illustrated in FIG. 8 is an image space including database image 81a corresponding to database image 44A. A position (coordinates) of reference article 71A in bundle image space 82 related to a position (upper left) of reference article 71A under an assumption that reference article 71A is included in a bundle is a position of article B401A, describing by use of FIG. 5. Further, a position of a second article in bundle image space 82 related to a position of the second article (in this case, adjacent on the right) relative to the position (upper left) of reference article 71A relates to a position of article B401B positioned adjacently on the right side of article B401A, describing by use of FIG. 5. Determination unit 130 transforms coordinates on database image 81a in article image space 81 into coordinates in bundle image space 82 by use of H[P401→B401B] (S1). Image 82B illustrated in FIG. 8 is an image in bundle image space 82 related to database image 81a.

Next, determination unit 130 further transforms coordinates on database image 81a transformed into coordinates in bundle image space 82 into coordinates in article image space 81. The transformation is performed by use of an inverse matrix of H[P401→B401A] being a homography matrix between a position (coordinates) of reference article 71A in bundle image space 82 related to a position (upper left) of reference article 71A under the assumption that reference article 71A is included in the bundle, and coordinates of database image 44A.

An inverse matrix of H[P401→B401A] is denoted as $H^{-1}$[P401→B401A]. Determination unit 130 transforms coordinates on database image 81a transformed into coordinates in bundle image space 82 (corresponding to coordinates on image 82B) into coordinates in article image space 81 by use of $H^{-1}$[P401→B401A] (S2). Image 81b illustrated in FIG. 8 is an image related to image 82B in article image space 81.

Then, determination unit 130 transforms the coordinates transformed in S2 into coordinates on captured image 70. The transformation is performed by use of H[P401→71A] being a homography matrix between coordinates in a region of reference article 71A on captured image 70 and coordinates on database image 44A.

Figure 9:
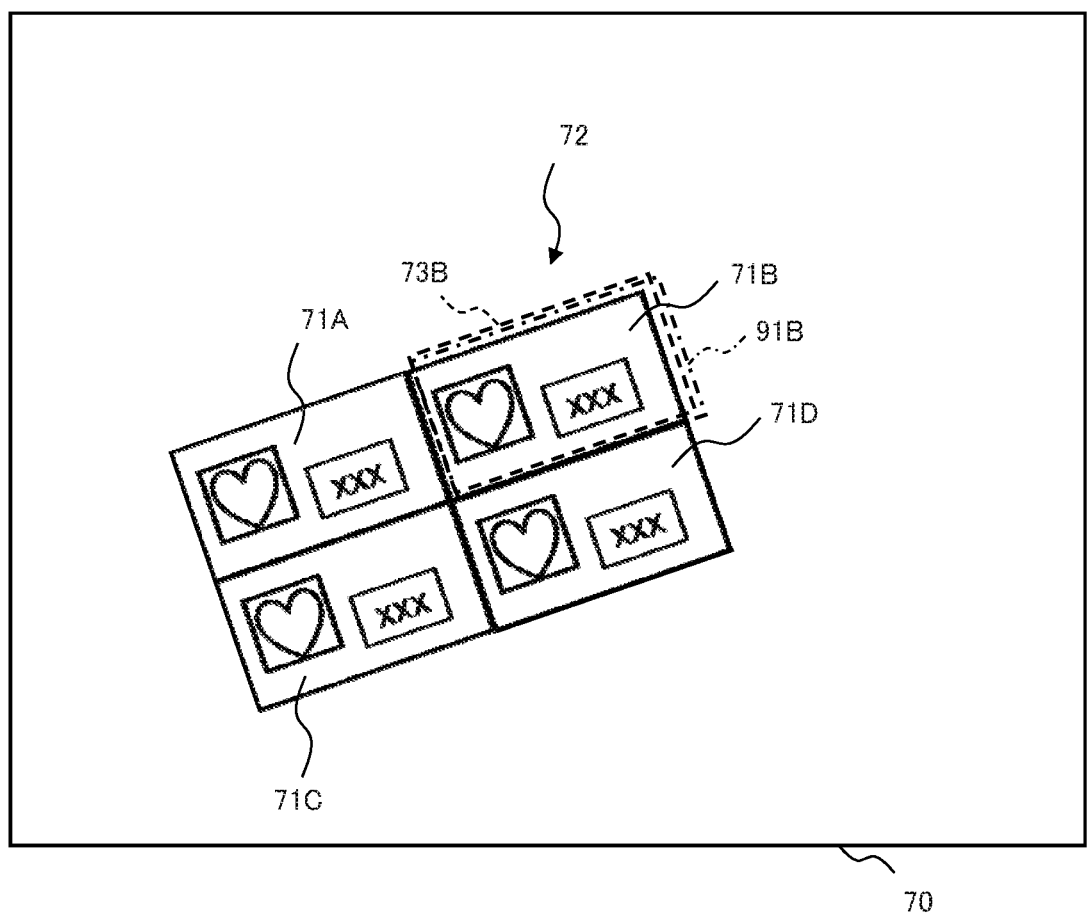
FIG. 9 is a diagram illustrating an example of a region indicated by coordinates after transformation when coordinates on a database image are transformed into coordinates on a captured image.

FIG. 9 is a diagram illustrating an example of a region (first region) indicated by coordinates after transformation when the coordinates on database image 81a are transformed into the coordinates on captured image 70. Captured image 70 illustrated in FIG. 9 is similar to captured image 70 illustrated in FIG. 7.

Frame 91B in dot-and-dash lines illustrated in FIG. 9 illustrates an example of a region indicated by coordinates after transformation when the coordinates of database image 81a are transformed into the coordinates on captured image 70. The region indicated by this frame 91B is a region estimated by use of H[P401→B401B], $H^{-1}$[P401→B401A], and H[P401→71A]. The estimated region indicates a region of coordinates on image 81b estimated to be positioned adjacently on the right side of an article indicated by database image 81a in a coordinate space of captured image 70 under an assumption that the article constitutes a bundle.

A comparison between a region (second region) indicated by frame 73B and a region indicated by frame 91B tells that the frames almost overlap each another. Determination unit 130 calculates an overlap rate being a value indicating a degree of overlap between the frame 73B region and the frame 91B region. Then, when the overlap rate is equal to or greater than a predetermined threshold value, determination unit 130 determines that article 71B included in frame 73B is an article constituting a bundle along with article 71A. Determination unit 130 makes a similar determination for article 71C and article 71D. Consequently, determination unit 130 determines whether or not a plurality of articles are articles constituting one bundle.

Thus, by using an overlap rate of regions for determination of whether or not a plurality of articles constitute a bundle, determination unit 130 can determine whether or not the plurality of articles constitute a bundle with a less amount of calculation.

Based on an overlap rate indicating a ratio between an area of one region and an area of a region included in both of the one region and another region, determination unit 130 may determine whether or not an article related to regions (article 71B in the case of FIG. 9) is an article constituting a bundle along with reference article 71A. For example, determination unit 130 may make a determination, based on an overlap rate between an area of a frame 73B region and an area of a region included in both of the frame 73B region and the frame 91B region. Further, determination unit 130 may make a determination, based on an overlap rate between an area of the frame 91B region and an area of a region included in both of the frame 73B region and the frame 91B region. Further, determination unit 130 may make a determination by use of the two overlap rates. Further, without being limited to the above, an overlap rate may be a ratio between the sum of two areas and an area of a region included in both or may be a ratio between an area of a part included in at least either of two regions and an area of a region included in both.

Further, determination unit 130 may determine whether or not an article related to regions is an article constituting a bundle along with a reference article, not by regions but by closeness between parameters. For example, determination unit 130 calculates H[P401→71A]×$H^{-1}$[P401→B401A]×H[P401→B401B] and calculates a degree of similarity between the calculation result and H[P401→71B]. The degree of similarity may be any indicator. For example, the degree of similarity may be closeness between values in matrices or may be closeness between values based on any indicator derived based on a matrix. Then, when the degree of similarity satisfies a predetermined condition, such as the degree of similarity being equal to or greater than a predetermined threshold value, determination unit 130 may determine that the article related to the regions is an article constituting a bundle along with the reference article.

Thus, by using a degree of similarity between matrices in determination of whether or not an article related to regions is an article constituting a bundle along with a reference article, object identification device 100 can more accurately determine whether or not the article related to the regions is an article constituting a bundle along with the reference article, compared with a case of using an overlap rate between the regions. When determining a degree of similarity, determination unit 130 may calculate, after acquiring parameter 64, based on a check result, a second parameter being the same type as aforementioned parameter 64.

Further, determination unit 130 may determine whether or not an article related to regions is an article constituting a bundle along with a reference article, by use of a feature point instead of all coordinates on database image 44. For example, determination unit 130 may determine that an article related to regions is an article constituting a bundle along with a reference article when a distance between coordinates of a feature point transformed by use of H[P401→B401B], $H^{-1}$[P401→B401A], and H[P401→71A], and coordinates of the feature point transformed by use of H[P401→71B] is equal to or less than a predetermined threshold value.

Figure 10:
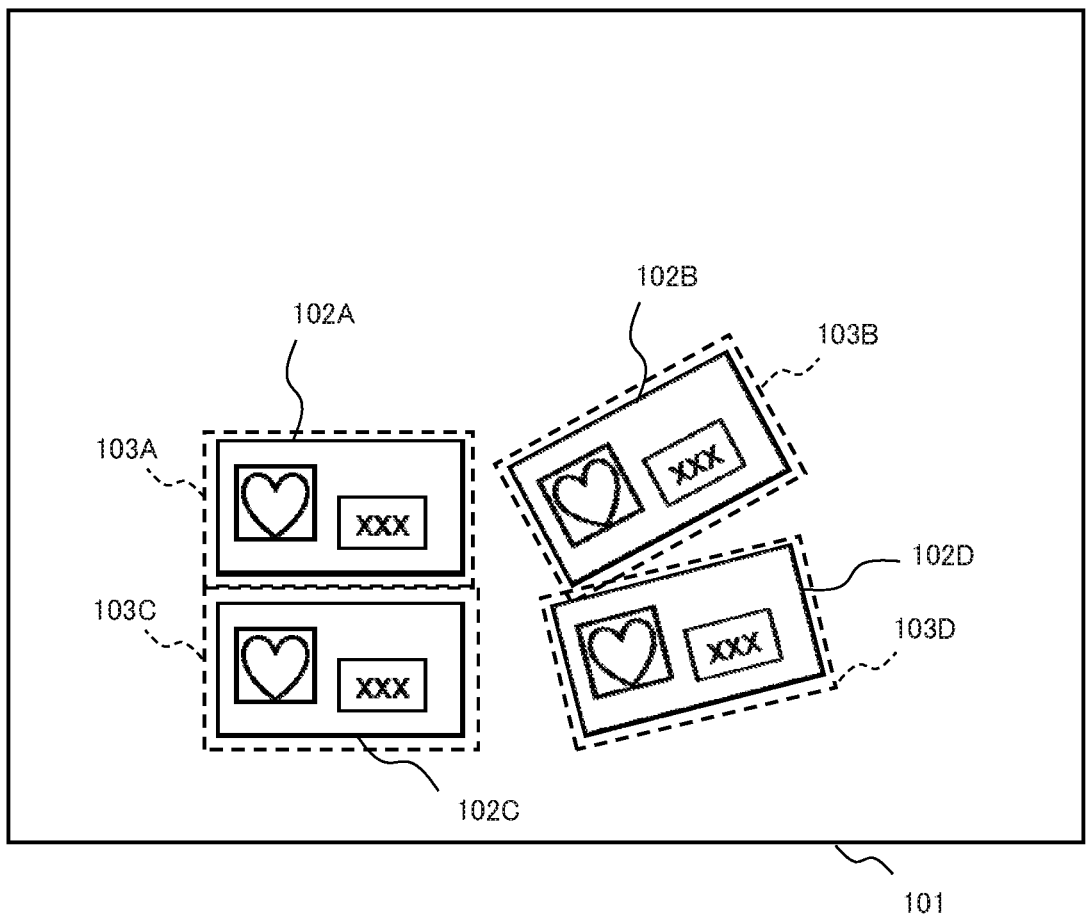
FIG. 10 is a diagram for further illustrating the determination processing performed by the determination unit.

FIG. 10 is another diagram for illustrating the determination processing performed by determination unit 130. Captured image 101 illustrated in FIG. 10 is an image acquired by capturing an image of four articles (102A to 102D). Four articles (102A to 102D) are not grouped together. As illustrated in FIG. 10, captured image 101 includes four articles (102A to 102D). Check unit 120 checks such captured image 101 against database image 44 by use of feature information extracted from database image 44 and feature information extracted from captured image 101. A method of correctly identifying each of four articles (102A to 102D) to be an article and not to constitute a bundle will be described.

Determination unit 130 calculates, from the check result, a parameter (a second parameter described above) indicating a geometric relation between database image 44A and captured image 101. The calculation is performed by use of the feature information of database image 44A and the feature information extracted from captured image 101 that are used for the check by check unit 120. The calculated four second parameters are denoted as H[P401→102A], H[P401→102B], H[P401→102C], and H[P401→102D]. H[P401→102A] is a homography matrix for transforming coordinates on database image 44 into coordinates on an image in an article 102A part in captured image 101.

Each of frames 103A to 103D in broken lines illustrated in FIG. 10 indicates a region on captured image 101 indicated by coordinates on captured image 101 transformed from coordinates on database image 44 by use of the aforementioned homography matrix.

In this case, article 102A is set as a reference article. Determination unit 130 transforms coordinates on database image 44 in the article image space into coordinates in the bundle image space by use of H[P401→B401B]. Then, determination unit 130 performs a transformation of coordinates. The transformation is performed by use of a homography matrix between coordinates of a position in the bundle image space related to a position of the reference article in a bundle and coordinates on database image 44A. As illustrated in FIG. 10, reference article 102A is an article positioned in the upper left corner of the four articles. Therefore, determination unit 130 further transforms the coordinates on database image 44A transformed into the coordinates in the bundle image space into coordinates in the article image space, by use of $H^{-1}$[P401→B401A]. Determination unit 130 further transforms the coordinates transformed into the coordinates in the article image space into coordinates on captured image 101. The transformation is performed by use of H[P401→102A] being a homography matrix between coordinates in the reference article 102A region and coordinates on database image 44A.

Figure 11:
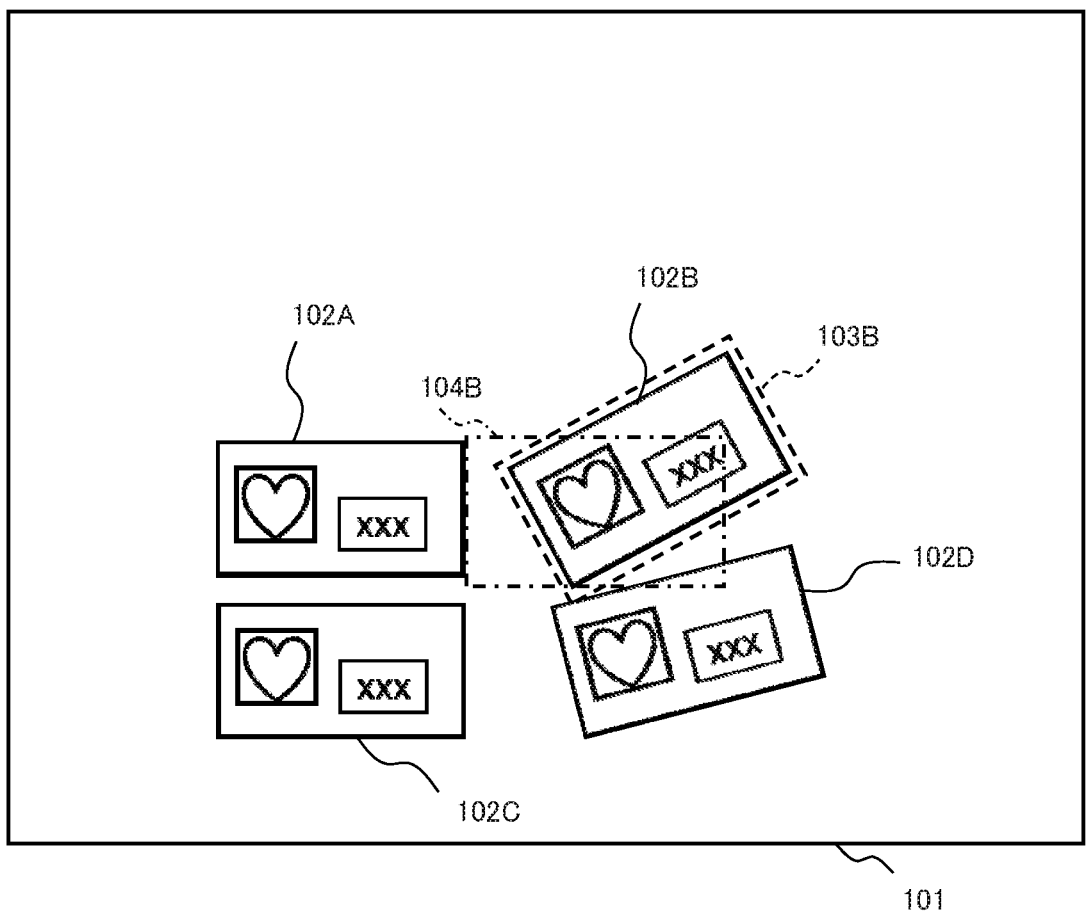
FIG. 11 is a diagram illustrating another example of a region indicated by coordinates after transformation when coordinates on a database image are transformed into coordinates on a captured image.

FIG. 11 is a diagram illustrating an example of a region indicated by coordinates after transformation when coordinates on database image 44A are transformed into coordinates on captured image 101. Captured image 101 illustrated in FIG. 11 is similar to captured image 101 illustrated in FIG. 10.

Frame 104B in dot-and-dash lines illustrated in FIG. 11 represents an example of a region indicated by coordinates after transformation when coordinates on database image 44A are transformed into coordinates on captured image 101. The region indicated by this frame 104B is a region estimated by use of H[P401→B401B], $H^{-1}$[P401→B401A], and H[P401→102A]. The estimated region indicates a region of coordinates estimated to be positioned adjacently on the right side of an article under an assumption that the article indicated by database image 44 constitutes a bundle, in a coordinate space of captured image 101.

A comparison between the region indicated by frame 103B and the region indicated by frame 104B indicates a greater non-overlapping portion compared with a region indicated by frame 73B and a region indicated by frame 91B in FIG. 9. Consequently, determination unit 130 determines that article 102B is not an article constituting a bundle along with article 102A. In other words, determination unit 130 determines that each of article 102B and article 102A is an article. By making similar determinations on article 102C and article 102D, determination unit 130 determines that each object is an article. Consequently, determination unit 130 can determine that the articles included in FIG. 11 are four articles with an object name "XXX."

Thus, object identification device 100 according to the present example embodiment can correctly determine whether an object is an article or a bundle. Accordingly, object identification device 100 can precisely identify a number of objects for each packing unit.

Determination unit 130 supplies information indicating an article (for example, an object name) and a number of articles for each packing unit to output control unit 140 as a determination result.

Based on a determination result supplied from determination unit 130, output control unit 140 controls output of information indicating the determination result. For example, when output device 400 is a display device such as a display (display unit) or a terminal device including a display, output control unit 140 outputs a control signal to output device 400. The control signal is for displaying the information indicating the determination result on a screen. Consequently, output device 400 displays the information indicating the determination result on the screen.

Further, when output device 400 is a device outputting received information as a file, output control unit 140 outputs, to output device 400, a control signal for outputting the information indicating the determination result as a file. Consequently, output device 400 outputs the information indicating the determination result as a file.

Figures 12, 13:
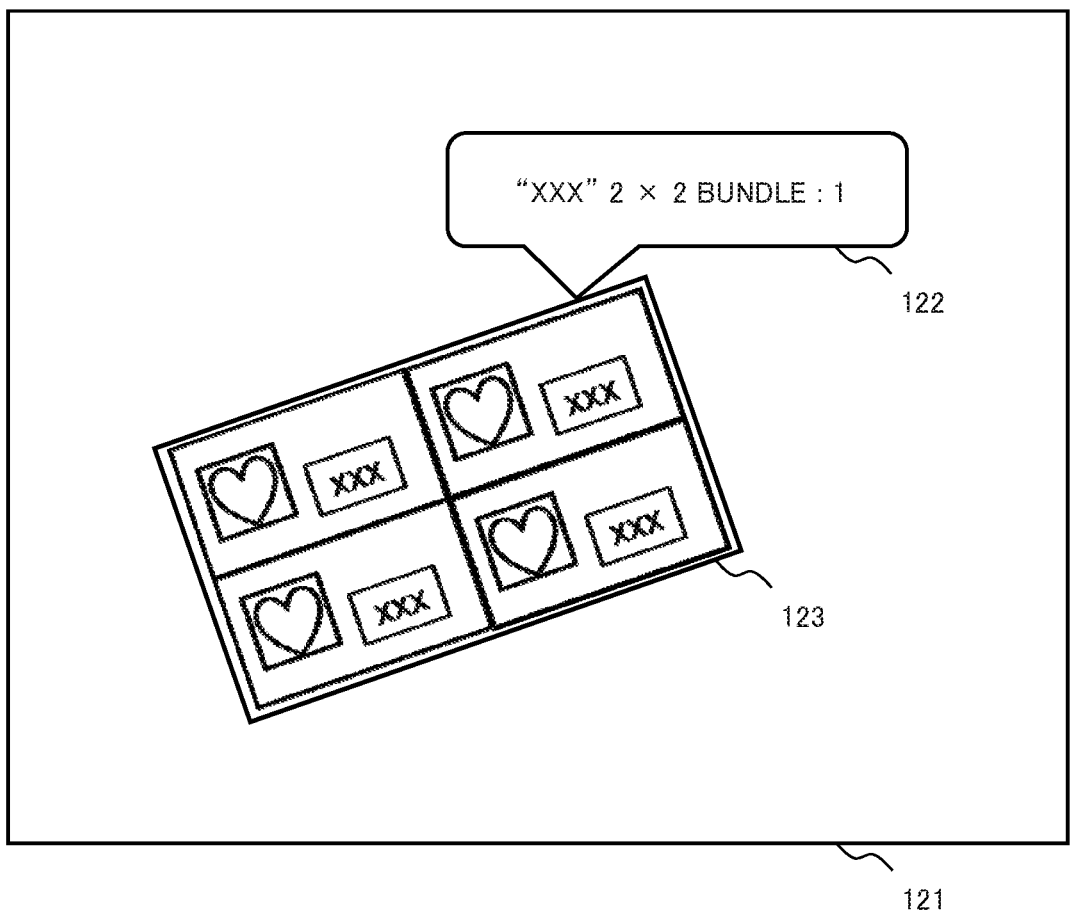
FIG. 12 is a diagram illustrating an example of a screen output by an output device when the output device is a display device or a terminal device including a display.
FIG. 13 is a diagram illustrating an example of an output file when the output device is a device outputting received information as a file.

FIG. 12 is a diagram illustrating an example of a display screen output by output device 400 when output device 400 is a display device or a terminal device including a display.

Output control unit 140 generates a control signal for causing a display unit such as a display to display a display screen in which information indicating a determination result is superimposed on a captured image. Based on the control signal generated by output control unit 140, output device 400 displays, on the display unit, a display screen in which the information indicating the determination result is superimposed on the captured image.

Display screen 121 illustrated in FIG. 12 is a screen displaying captured image 70 including bundle 72 composed of articles (71A to 71D) illustrated in FIG. 7 on a display unit. By output control unit 140 generating a display screen in which information 122 indicating a determination result is superimposed on captured image 70, output device 400 displays display screen 121 illustrated in FIG. 12. A display method of a packing unit is not particularly limited; and for example, in a case of an article, information indicating an article may be displayed. Further, in a case of a bundle, a shape or a number of articles grouped together may be displayed.

Output control unit 140 may generate a display screen in which information indicating a determination result is associated with a related article for each object name and for each packing unit of an article. For example, when captured image 70 includes a bundle for one article and a bundle for another article, output control unit 140 receives a determination result along with information indicating a position of an identified object (an article and/or a bundle). Then, based on a received determination result and received information indicating a position, output control unit 140 generates a display screen in which information indicating a determination result for the one object is associated with the bundle of articles. Similarly, output control unit 140 associates information indicating a determination result for the other object with the bundle of the other article in the display screen. Thus, by output control unit 140 generating a display screen in which information indicating a determination result is associated with a related article for each object name and for each packing unit of an object, output device 400 displays the display screen in which the determination result is associated with the object. Accordingly, object identification device 100 allows operator 2 viewing a display screen to readily grasp a quantity for each article and each packing unit of an article.

Further, output control unit 140 may generate a control signal causing a display unit such as a display to display a display screen in which positional information is superimposed on a captured image. The positional information indicates a position of an identified article on the captured image when a packing unit is an article and indicates a bundle part when the packing unit is a bundle. For example, output control unit 140 may generate a display screen in which positional information indicating a position of bundle 72 on a captured image is superimposed on captured image 70. As illustrated in FIG. 12, output control unit 140 may generate frame 123 including all regions (regions represented by frames 73A to 73D) of articles (71A to 71D) included in bundle 72 at the position of bundle 72. Then, output control unit 140 may generate a display screen in which frame 123 is superimposed on captured image 70.

Thus, by displaying, on a display unit, a display screen in which information indicating a determination result is superimposed on a captured image, based on a control signal generated by output control unit 140, output device 400 can allow an operator 2 viewing the display screen to readily grasp a number of articles for each packing unit.

FIG. 13 is a diagram illustrating an example of an output file when output device 400 is a device outputting received information as a file. Output file 131 illustrated in FIG. 13 is tabular data including a column for object name 132, a column for packing unit 133, and a column for quantity 134. Output control unit 140 may generate a control signal for controlling output device 400 in such a way as to output such output file 131, based on a determination result. Consequently, operator 2 can readily grasp which article is included in a captured image in which packing unit and in what quantity. Further, for example, output control unit 140 may compare a list of articles to be included in a captured image with a determination result and perform control in such a way as to display the comparison result on output device 400.

Figure 14:
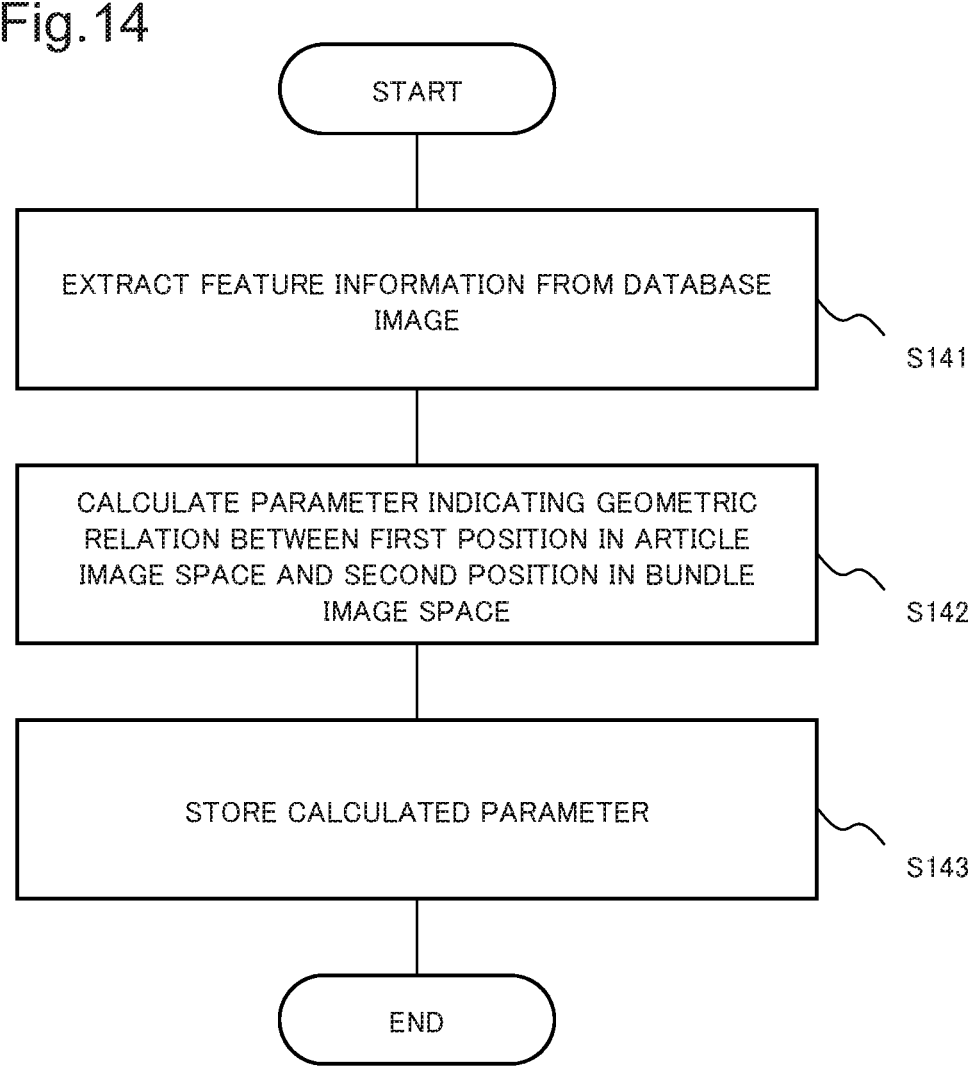
FIG. 14 is a flowchart illustrating an example of a processing flow in the calculation device.

FIG. 14 is a flowchart illustrating an example of a processing flow in calculation device 200 in system 1 according to the present example embodiment. As described in FIG. 14, second feature extraction unit 220 extracts feature information from database image 44 stored in image storage 210 (Step S141).

Then, based on the extracted feature information, parameter calculation unit 230 calculates a parameter indicating a geometric relation between a first position in the article image space and a second position in the bundle image space (Step S142).

As described above, the parameter is used along with a second parameter indicating a geometric relation between a first position and a third position related to the first position on a captured image, when determining, in a case of a plurality of articles being identified on a captured image by a check using database image 44, whether or not the plurality of identified articles constitute an object (bundle) grouping the articles together, based on a predetermined condition.

Subsequently, parameter calculation unit 230 stores the calculated parameter into Parameter storage 240 (Step S143).

Figure 15:
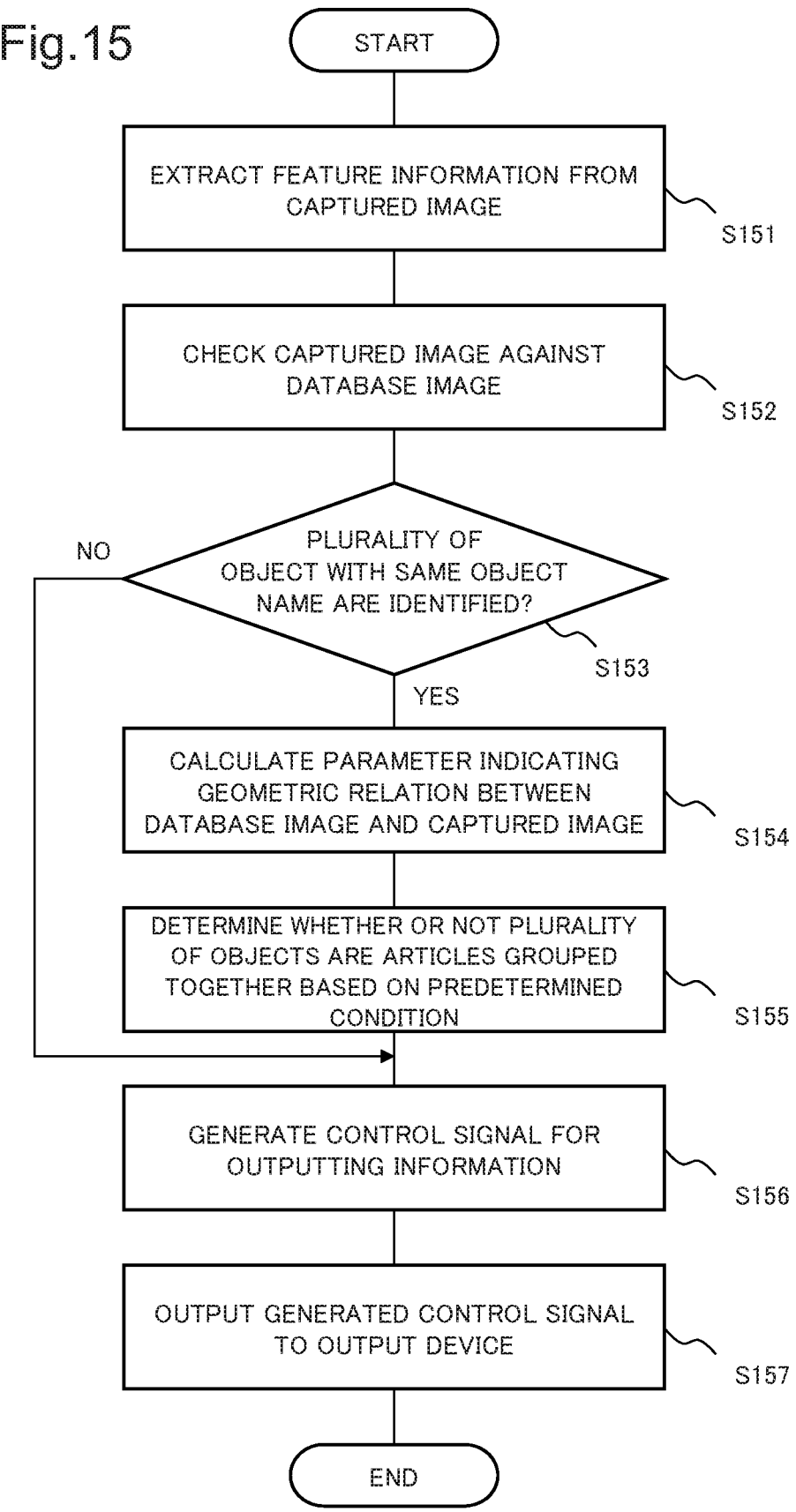
FIG. 15 is a flowchart illustrating an example of a processing flow in the object identification device.

FIG. 15 is a flowchart illustrating an example of a processing flow in object identification device 100 in system 1 according to the present example embodiment. As described in FIG. 15, first feature extraction unit 110 in object identification device 100 extracts feature information from an acquired captured image (Step S151).

Then, by use of the feature information extracted from the captured image and the feature information extracted from database image 44 in Step S141, check unit 120 checks the captured image against database image 44 (Step S152).

Determination unit 130 refers to the check result and determines whether or not a plurality of objects are identified and also the identified objects indicate the same objects name (Step S153). When a plurality of objects with the same object name are not identified (NO in Step S153), the processing proceeds to Step S156.

When a plurality of articles with the same object name are identified (YES in Step S153), determination unit 130 calculates a parameter (second parameter) indicating a geometric relation between database image 44 related to the identified article (matching the captured image) and the captured image (Step S154).

Then, by use of the parameter calculated in Step S142 and the parameter calculated in Step S154, whether or not the plurality of objects are articles grouped together based on a predetermined condition is determined (Step S155).

Subsequently, output control unit 140 generates a control signal for controlling output of information by output device 400 (Step S156). In a case of after execution of Step S155, output control unit 140 generates a control signal for outputting information indicating the determination result, based on the determination result. Then, output control unit 140 outputs the generated control signal to output device 400 (Step S157).

Consequently, based on the control signal output by output control unit 140, output device 400 can display, for example, display screen 121 as illustrated in FIG. 12 on a display unit.

An example of the predetermined condition including (1) to (3) described below has been described in the present example embodiment.
(1) Number of articles is four.
(2) All articles are directed in the same direction.
(3) Articles are arranged in two rows and two columns.

Figure 16:
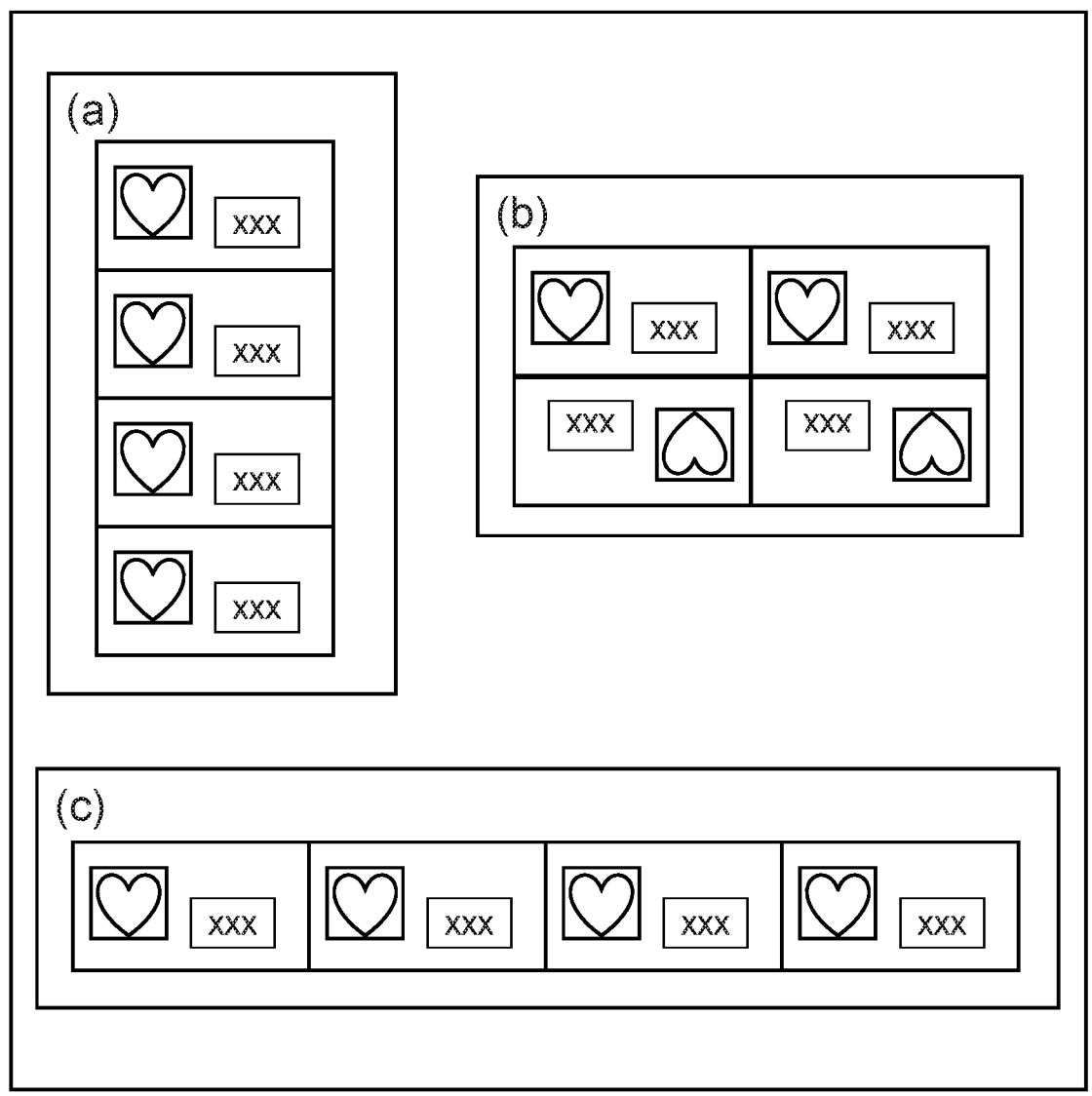
FIG. 16 is a diagram illustrating an example of a predetermined condition when there are four articles.

However, the predetermined condition is not limited to the above. Examples of the predetermined condition in a case of four articles are illustrated in FIG. 16. A part (a) in FIG. 16 is an example when the predetermined condition includes: a number of articles is four; all four articles are directed in the same direction; and the articles are vertically arranged in one column. A part (b) in FIG. 16 is an example when the predetermined condition includes: a number of articles is four; articles are arranged in two rows and two columns; and an upper part of an article faces outside. A part (c) in FIG. 16 is an example when the predetermined condition includes: a number of articles is four; all articles are directed in the same direction; and articles are lined up side by side.

Thus, when a plurality of packing units of articles exist, parameter calculation unit 230 calculates a parameter for each packing unit and stores the parameter into Parameter storage 240. At this time, it is preferable that parameter calculation unit 230 store information indicating a predetermined condition into Parameter storage 240, along with the parameter. Consequently, object identification device 100 can suitably determine whether or not articles constitute a bundle for any packing unit. A number of articles included in a bundle is not particularly limited and may be any number.

As described above, check unit 120 in object identification device 100 in system 1 according to the present example embodiment checks a captured image against a database image for identifying an object. Then, when the check result indicates that a plurality of objects are included in the captured image, determination unit 130 determines whether or not the plurality of identified objects are articles grouped together based on a predetermined condition. The determination is made by use of a first parameter and a second parameter. The first parameter indicates a geometric relation between a first position on a database image in an image space and a second position related to the first position in the image space when a plurality of articles indicated by the database image are grouped together based on the predetermined condition. Further, the second parameter indicates a geometric relation between the first position and a third position related to the first position on the captured image.

For example, when a captured image is checked against a database image in a case that the captured image includes one bundle composed of four articles, four articles are assumed to be included in the captured image from the check result. Determination unit 130 according to the present example embodiment determines whether or not the plurality of identified articles constitute a bundle, based on the check result by determining whether or not an article is positioned at a position forming a bundle relative to another article. The latter determination is based on a parameter indicating a geometric relation between a position on a database image and a position in a bundle image space when articles constitute a bundle, and a parameter indicating a geometric relation between the captured image and the database image. Consequently, object identification device 100 can determine whether the plurality of objects included in the captured image are articles grouped together based on a predetermined condition or individual articles.

Accordingly, even when a plurality of objects are articles grouped together as one bundle, object identification device 100 according to the present example embodiment can accurately determine the articles as one bundle instead of a plurality of articles.

Accordingly, object identification device 100 according to the present example embodiment can precisely identify a number of articles to be identified for each packing unit.

In system 1 according to the present example embodiment, image capture device 300 may be integrally formed with object identification device 100 and function as, for example, an intelligence camera. Further, part of the functions of calculation device 200 may be built into object identification device 100. For example, first feature extraction unit 110 and second feature extraction unit 220 may be provided by the same circuit.

Thus, the devices in system 1 illustrated in FIG. 1 may be configured in combination.

Second Example Embodiment

A second example embodiment of the present disclosure will be described. A basic configuration according to the present example embodiment resolving the problem to be resolved by the present disclosure will be described.

Figure 17:
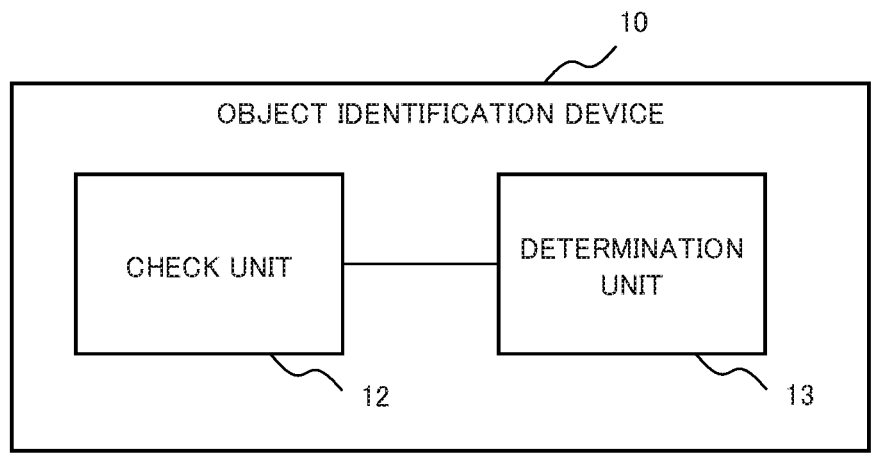
FIG. 17 is a functional block diagram illustrating an example of a functional configuration of an object identification device according to a second example embodiment.

FIG. 17 is a functional block diagram illustrating an example of a functional configuration of object identification device 10 according to the present example embodiment. As illustrated in FIG. 17, object identification device 10 according to the present example embodiment includes check unit 12 and determination unit 13.

Check unit 12 has the function of aforementioned check unit 120. Check unit 12 checks a captured image against an image for identification for identifying an object. Check unit 12 supplies the check result to determination unit 13. A method of checking performed by check unit 12 is not particularly limited, and a method similar to that by aforementioned check unit 120 may be employed.

Determination unit 13 has the function of aforementioned determination unit 130. When a check result indicates that a plurality of objects are included in a captured image, determination unit 13 determines whether or not the plurality of identified objects are articles grouped together based on a predetermined condition, based on a first parameter and a second parameter. The first parameter indicates a geometric relation between a first position in a first space being an image space of an image for identification and a second position related to the first position in a second space representing an image space when a plurality of articles indicated by the image for identification are grouped together based on a predetermined condition. Further, the second parameter indicates a geometric relation between the first position and a third position related to a first position on the captured image.

Since it can be understood that a plurality of articles are identified based on a check result, the plurality of articles are assumed to include a first article and a second article different from the first article in the description.

Similarly to aforementioned determination unit 130, when an overlap rate is equal to or greater than a predetermined threshold value, determination unit 13 may determine that the plurality of identified objects are articles grouped together. The overlap rate indicates a degree of overlap between a first region indicated by coordinates transformed by performing (1) to (3) described below and a second region on a captured image of the second article, the second region being acquired from the second parameter related to the second article on the captured image.

(1) Transform coordinates of an image for identification into coordinates in the second space by use of the first parameter related to the second article in the second space, based on a position of the second article relative to a position of the first article.
(2) Transform the coordinates transformed into coordinates in the second space into coordinates in the first space, based on the first parameter related to the first article in the second space.
(3) Transform the coordinates transformed into coordinates in the first space into coordinates on the captured image by use of the second parameter related to the first article on the captured image.

Figure 18:
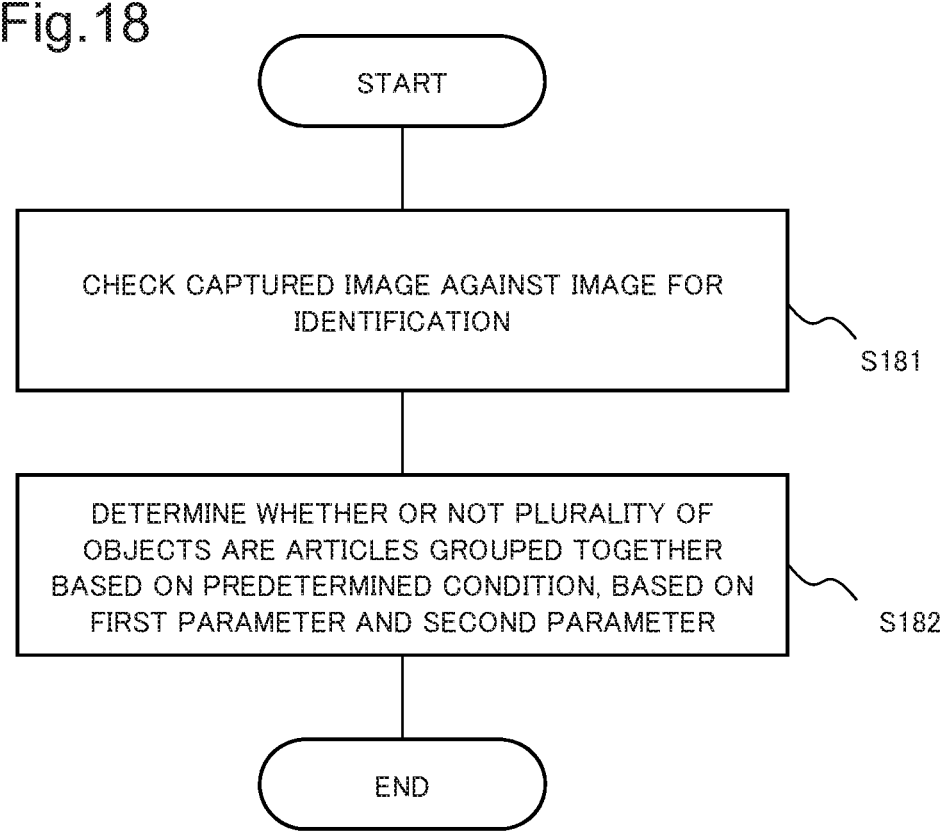
FIG. 18 is a flowchart illustrating an example of a processing flow in the object identification device according to the second example embodiment.

FIG. 18 is a flowchart illustrating an example of a processing flow in object identification device 10 according to the present example embodiment. As described in FIG. 18, check unit 12 checks a captured image against an image for identification for identifying an object (Step S181). Then, determination unit 13 determines whether or not a plurality of objects are articles grouped together based on a predetermined condition, based on a first parameter and a second parameter (Step S182).

Figure 19:
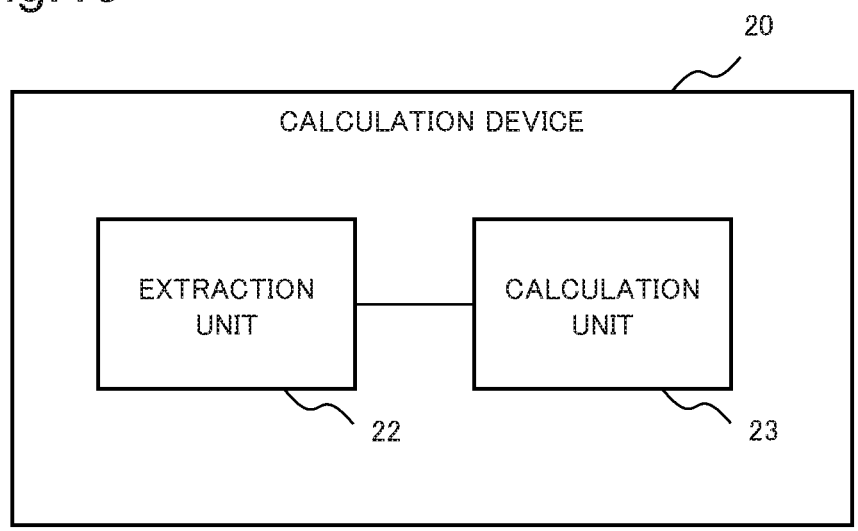
FIG. 19 is a functional block diagram illustrating an example of a functional configuration of a calculation device calculating a first parameter referred to by the object identification device, according to the second example embodiment.

FIG. 19 is a functional block diagram illustrating an example of a functional configuration of calculation device 20 calculating a first parameter referred to by aforementioned object identification device 10. As illustrated in FIG. 19, calculation device 20 includes extraction unit 22 and calculation unit 23.

Extraction unit 22 has the function of aforementioned second feature extraction unit 220. Extraction unit 22 extracts feature information indicating a feature of an object from each of a plurality of images for identification for identifying articles. Extraction unit 22 supplies the extracted feature information to calculation unit 23.

Calculation unit 23 has the function of aforementioned parameter calculation unit 230. Based on extracted feature information, calculation unit 23 calculates a first parameter indicating a geometric relation between a first position in a first space being an image space of an image for identification and a second position related to the first position in a second space representing an image space when a plurality of articles indicated by the image for identification are grouped together based on a predetermined condition. As described above, the first parameter is used along with a second parameter indicating a geometric relation between the first position and a third position related to the first position on a captured image, when determining whether or not a plurality of identified objects are articles grouped together based on a predetermined condition, in a case of the plurality of articles being identified on the captured image by a check by object identification device 10 using the image for identification.

Figure 20:
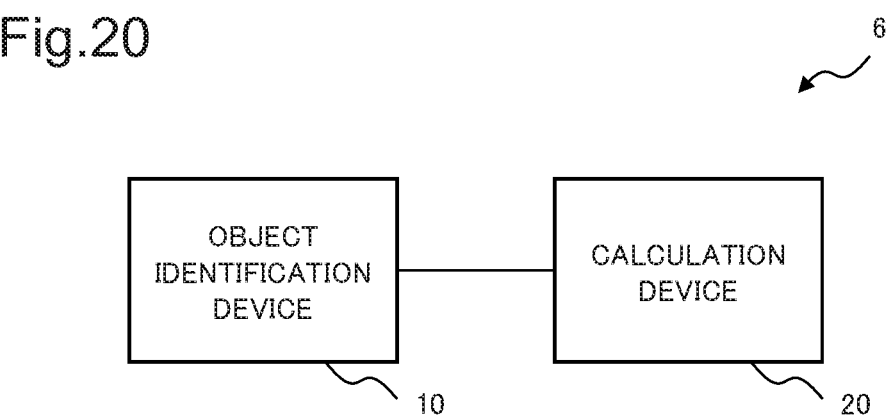
FIG. 20 is a block diagram illustrating a configuration example of a system including the object identification device and the calculation device, according to the second example embodiment.

Further, object identification device 10 and calculation device 20, according to the present example embodiment, may be configured as system 6 illustrated in FIG. 20. FIG. 20 is a block diagram illustrating a configuration example of a system including object identification device 10 and calculation device 20. As illustrated in FIG. 20, system 6 includes object identification device 10 and calculation device 20. Object identification device 10 and calculation device 20 are communicably connected to each another.

Object identification device 10 may be integrally formed with calculation device 20, or part of the functions of calculation device 20 may be built into object identification device 10. Further, system 6 may be configured to include image capture device 300 and output device 400, similarly to aforementioned system 1.

For example, when a captured image including an object (one bundle) composed of four articles grouped together is checked against an image for identification, the captured image is assumed to include four articles from the check result. Based on the check result, determination unit 13 according to the present example embodiment determines whether or not the plurality of identified articles constitute a bundle by determining whether or not an article is positioned at a position forming a bundle relative to another article, based on a first parameter and a second parameter. The first parameter indicates a geometric relation between a position on the image for identification and a position in a bundle image space when an object is a bundle. The second parameter indicates a geometric relation between the captured image and the image for identification. Consequently, object identification device 10 can determine whether the plurality of objects included in the captured image are articles grouped together based on a predetermined condition or individual articles.

Accordingly, when a plurality of objects are articles grouped together based on a predetermined condition, object identification device 10 according to the present example embodiment can accurately determine the objects as articles grouped together instead of individual articles.

Accordingly, object identification device 10 according to the present example embodiment can precisely identify a number of articles to be identified for each packing unit.

Hardware Configuration

Figure 21:
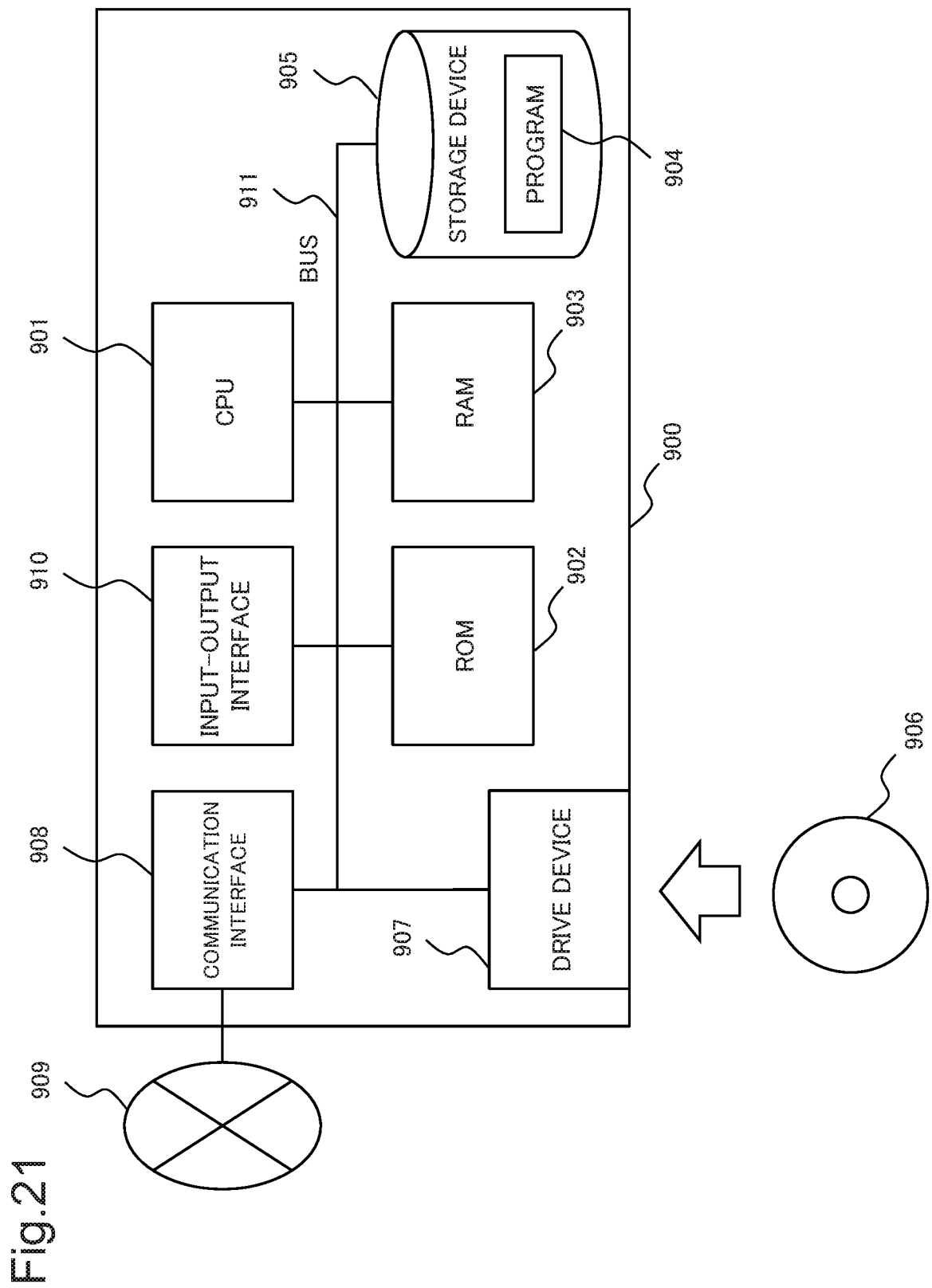
FIG. 21 is a diagram exemplarily illustrating a hardware configuration of a computer (information processing device) capable of providing each example embodiment.

Each component in each device according to each example embodiment of the present disclosure represents a function-based block. For example, a part or the whole of each component in each device is provided by any combination of information processing device 900 as illustrated in FIG. 21 and a program. FIG. 21 is a block diagram illustrating an example of a hardware configuration of information processing device 900 providing each component in each device. As an example, information processing device 900 includes the following components.

Central processing unit CPU) 901
Read only memory (ROM) 902
Random access memory (RAM) 903
Program 904 loaded on RAM 903
Storage device 905 storing program 904
Drive device 907 performing a read and a write from and into recording medium 906
Communication interface 908 connected to communication network 909
Input-output interface 910 performing input and output of data
Bus 911 connecting the components Each component in each device according to each example embodiment is provided by CPU 901 acquiring and executing program 904 providing the function of the component. For example, program 904 providing the function of each component in each device is previously stored in storage device 905 or ROM 902, and is loaded into RAM 903 and executed by CPU 901, as needed. Program 904 may be supplied to CPU 901 through communication network 909 or may be previously stored in recording medium 906, and drive device 907 may read the program and supply the program to CPU 901.

There are various modified examples of the method of providing each device. For example, each device may be provided by any combination of a separate information processing device 900 and a program, for each component. Further, a plurality of components included in each device may be provided by any combination of one information processing device 900 and a program.

Further, a part or the whole of each component in each device is provided by another general-purpose or dedicated circuit, a processor or the like, or a combination thereof. The above may be configured with a single chip or may be configured with a plurality of chips connected through a bus.

A part or the whole of each component in each device may be provided by a combination of the aforementioned circuit or the like, and a program.

When a part or the whole of each component in each device is provided by a plurality of information processing devices, circuits, or the like, the plurality of information processing devices, circuits, or the like may be placed in a concentrated manner or in a distributed manner. For example, the information processing devices, the circuits, or the like may be provided in a form of being connected to one another through a communication network, such as a client-server system or a cloud computing system.

The respective aforementioned example embodiments are preferred example embodiments of the present disclosure, and the scope of the present disclosure is not limited to the respective aforementioned example embodiments. A person skilled in the art can make example embodiments which include various changes through modifying and substituting the respective aforementioned example embodiments without departing from the spirit and scope of the present disclosure.

For example, object identification device (10, 100) according to the present disclosure may be suitably used in a system including a camera installed in the neighborhood of a cash register such as a point of sales (POS) register. In this case, aforementioned object identification device (10, 100) may be provided by being built into the POS register. The POS register may further have the function of calculation device (20, 200). Further, object identification device (10, 100) may cause the POS register to perform output similarly to output device 400. Even in this case, by determining whether or not a plurality of recognized objects are the same object from a captured image acquired by capturing an image of a commodity by the camera, object identification device (10, 100) can precisely identify a number of the objects to be identified.

Further, object identification device (10, 100) and calculation device (20, 200), according to the present disclosure, may be provided by a server device capable of communicating with the POS register. Then, object identification device (10, 100) may cause the POS register to perform output similarly to output device 400. Thus, object identification device (10, 100) and calculation device (20, 200), according to the present disclosure, may also be suitably applied to a configuration using a POS register already installed at a store.

The aforementioned POS register is not limited to a cash register operated by a clerk and may be either of a sharing-type cash register (semi-self-register) at which a customer performs a checkout and a cash register (self-register) at which a clerk is not involved when passing through the register (a series of operations up to a checkout is performed only by a customer).

A part or the whole of the aforementioned example embodiments may also be described as the following supplementary notes but are not limited thereto.

(Supplementary Note 1)

check means for checking a captured image against an identification image for identifying objects; and determination means for, in a case where a plurality of objects are identified to be included in the captured image, determining whether or not the identified objects are articles grouped together under a predetermined condition, by using a first parameter indicating a geometric relation between a first position in a first space being an image space of the identification image and a second position corresponding to the first position in a second space, the second space representing an image space in a case where objects indicated by the identification image are articles grouped together under the predetermined condition, and a second parameter indicating a geometric relation between the first position and a third position corresponding to the first position on the captured image.

(Supplementary Note 2)

The object identification device according to Supplementary Note 1, wherein the second position is a position of each of the articles grouped together, and the determination means calculates the second parameters for the number of the identified objects, based on a third position placed each of the identified objects, and determines whether or not the identified objects are the articles grouped together, by using the first parameters for the number of the articles grouped together and the second parameters.

(Supplementary Note 3)

The object identification device according to Supplementary Note 2, wherein the identified objects include a first object and a second object which is different from the first object, and the determination means (i) transforms coordinates on the identification image into coordinates in the second space by use of the first parameter related to a second object in the second space, based on a position of the second object relative to a position of the first object, (ii) transforms the transformed coordinates into coordinates in the first space, based on the first parameter related to the first object in the second space, and (iii) transforms coordinates transformed into coordinates in the first space into coordinates on the captured image by use of the second parameter related to the first object on the captured image, and determines the identified objects are the articles grouped together in a case where an overlap rate indicating a degree of overlap between a first region indicated by coordinates transformed into coordinates on the captured image and a second region on the captured image of the second object, the second region being acquired from the second parameter related to the second object on the captured image, is equal to or greater than a predetermined threshold value.

(Supplementary Note 4)

The object identification device according to Supplementary Note 2, wherein identified objects include a first object and a second object which is different from the first object, and the determination means determines whether or not the identified objects are articles grouped together under the predetermined condition, by use of a degree of similarity, based on a predetermined indicator between a value acquired from the first parameter related to the second object in the second space, the first parameter related to the first object in the second space, and the second parameter related to the first object on the captured image, and the second parameter related to the second object on the captured image.

(Supplementary Note 5)

The object identification device according to any one of Supplementary Notes 1 to 4, further comprising output control means for controlling output of information indicating a determination result by the determination means, wherein the output control means controls a display unit to display a display screen in which information indicating the determination result is superimposed on the captured image.

(Supplementary Note 6)

The object identification device according to Supplementary Note 5, wherein the output control means controls the display unit to display the display screen in which information indicating the determination result is associated with the articles grouped together or an individual article in the captured image.

(Supplementary Note 7)

An object identification method comprising:

checking a captured image against an identification image for identifying objects; and in a case where a plurality of objects are identified to be included in the captured image, determining whether or not the identified objects are articles grouped together under a predetermined condition, by using a first parameter indicating a geometric relation between a first position in a first space being an image space of the identification image and a second position corresponding to the first position in a second space, the second space representing an image space in a case where objects indicated by the identification image are articles grouped together under the predetermined condition, and a second parameter indicating a geometric relation between the first position and a third position corresponding to the first position on the captured image.

(Supplementary Note 8)

The object identification method according to Supplementary Note 7, wherein the second position is a position of each of the articles grouped together, and the method further comprising:

calculating the second parameters for the number of the identified objects, based on a third position placed each of the identified objects, and determining whether or not the identified objects are the articles grouped together, by using the first parameters for the number of the articles grouped together and the second parameters.

(Supplementary Note 9)

A non-transitory computer readable recording medium having a program recorded thereon, the program causing a computer to execute processing of:

checking a captured image against an identification image for identifying objects; and in a case where a plurality of objects are identified to be included in the captured image, determining whether or not the identified objects are articles grouped together under a predetermined condition, by using a first parameter indicating a geometric relation between a first position in a first space being an image space of the identification image and a second position corresponding to the first position in a second space, the second space representing an image space in a case where objects indicated by the identification image are articles grouped together under the predetermined condition, and a second parameter indicating a geometric relation between the first position and a third position corresponding to the first position on the captured image.

(Supplementary Note 10)

The recording medium according to Supplementary Note 9, wherein the second position is a position of each of the articles grouped together, and the determining further comprising:

calculating the second parameters for the number of the identified objects, based on a third position placed each of the identified objects, and determining whether or not the identified objects are the articles grouped together, by using the first parameters for the number of the articles grouped together and the second parameters.

(Supplementary Note 11)

A calculation device comprising:

extraction means for extracting feature information indicating a feature of an object, from an identification image for identifying the object; and calculation means for, in a case where a plurality of objects are identified on a captured image by a check using the identification image, calculating a first parameter used along with a second parameter when determining whether or not the plurality of identified objects are articles grouped together under a predetermined condition, based on the extracted feature information, the first parameter indicating a geometric relation between a first position in a first space being an image space of the identification image and a second position related to the first position in a second space representing an image space when a plurality of objects indicated by the identification image are articles grouped together under the predetermined condition, and the second parameter indicating a geometric relation between the first position and a third position related to the first position on the captured image.

(Supplementary Note 12)

A system comprising:

the object identification device according to any one of Supplementary Notes 1 to 6; and the calculation device according to Supplementary Note 11.

REFERENCE SIGNS LIST

1 System
6 System
10 Object identification device
12 Check unit
13 Determination unit
20 Calculation device
22 Extraction unit
23 Calculation unit
100 Object identification device
110 First feature extraction unit
120 Check Unit
130 Determination unit
140 Output control unit
200 Calculation device
210 Image storage
220 Second feature extraction unit
230 Parameter calculation unit
240 Parameter storage
300 Image capture device
400 Output device

The invention claimed is:

1. An object identification device comprising:
a processor;
a memory having stored therein computer instructions, wherein
the processor executes the instructions of:
checking a captured image against an identification image for identifying objects; and
in a case where a plurality of objects are identified to be included in the captured image, determining whether or not the identified objects are articles grouped together under a predetermined condition,
by using
a first parameter indicating a geometric relation between a first position in a first space being an image space of the identification image and a second position corresponding to the first position in a second space, the second space representing an image space in a case where objects indicated by the identification image are articles grouped together under the predetermined condition, and
a second parameter indicating a geometric relation between the first position and a third position corresponding to the first position on the captured image,
controlling output of information indicating a determination result, wherein in the controlling, controlling a display unit to display a display screen in which information indicating the determination result is superimposed on the captured image.

2. The object identification device according to claim 1, wherein
the second position is a position of each of the articles grouped together, and
the determining whether or not the identified objects are articles grouped together is further comprising
calculating the second parameters for the number of the identified objects, based on a third position placed each of the identified objects, and
determining whether or not the identified objects are the articles grouped together, by using the first parameters for the number of the articles grouped together and the second parameters.

3. The object identification device according to claim 2, wherein
the identified objects include a first object and a second object which is different from the first object, and
the determining whether or not the identified objects are articles grouped together is further comprising
transforming coordinates on the identification image into coordinates in the second space by use of the first parameter related to a second object in the second space, based on a position of the second object relative to a position of the first object, (ii) transforming the transformed coordinates into coordinates in the first space, based on the first parameter related to the first object in the second space, and (iii) transforming coordinates transformed into coordinates in the first space into coordinates on the captured image by use of the second parameter related to the first object on the captured image, and
determining the identified objects are the articles grouped together in a case where an overlap rate indicating a degree of overlap between a first region indicated by coordinates transformed into coordinates on the captured image and a second region on the captured image of the second object, the second region being acquired from the second parameter related to the second object on the captured image, is equal to or greater than a predetermined threshold value.

4. The object identification device according to claim 2, wherein
identified objects include a first object and a second object which is different from the first object, and
the determining whether or not the identified objects are articles grouped together is further comprising, determining whether or not the identified objects are articles grouped together under the predetermined condition, by use of a degree of similarity, based on a predetermined indicator between a value acquired from the first parameter related to the second object in the second space, the first parameter related to the first object in the second space, and the second parameter related to the first object on the captured image, and the second parameter related to the second object on the captured image.

5. The object identification device according to claim 1, wherein
in the controlling, controlling the display unit to display the display screen in which information indicating the determination result is associated with the articles grouped together or an individual article in the captured image.

6. An object identification method comprising:
checking a captured image against an identification image for identifying objects; and
in a case where a plurality of objects are identified to be included in the captured image, determining whether or not the identified objects are articles grouped together under a predetermined condition,
by using
a first parameter indicating a geometric relation between a first position in a first space being an image space of the identification image and a second position corresponding to the first position in a second space, the second space representing an image space in a case where objects indicated by the identification image are articles grouped together under the predetermined condition,
a second parameter indicating a geometric relation between the first position and a third position corresponding to the first position on the captured image,
controlling output of information indicating a determination result, wherein in the controlling, controlling a display unit to display a display screen in which information indicating the determination result is superimposed on the captured image.

7. The object identification method according to claim 6, wherein
the second position is a position of each of the articles grouped together, and the method further comprising:
calculating the second parameters for the number of the identified objects, based on a third position placed each of the identified objects, and
determining whether or not the identified objects are the articles grouped together, by using the first parameters for the number of the articles grouped together and the second parameters.

8. A non-transitory computer readable recording medium having a program recorded thereon, the program causing a computer to execute processing of:
checking a captured image against an identification image for identifying objects; and
in a case where a plurality of objects are identified to be included in the captured image, determining whether or not the identified objects are articles grouped together under a predetermined condition,
by using
a first parameter indicating a geometric relation between a first position in a first space being an image space of the identification image and a second position corresponding to the first position in a second space, the second space representing an image space in a case where objects indicated by the identification image are articles grouped together under the predetermined condition, and
a second parameter indicating a geometric relation between the first position and a third position corresponding to the first position on the captured image,
controlling output of information indicating a determination result, wherein in the controlling, controlling a display unit to display a display screen in which information indicating the determination result is superimposed on the captured image.

9. The recording medium according to claim 8, wherein
the second position is a position of each of the articles grouped together, and the determining further comprising:

calculating the second parameters for the number of the identified objects, based on a third position placed each of the identified objects, and determining whether or not the identified objects are the articles grouped together, by using the first parameters for the number of the articles grouped together and the second parameters.

10. The object identification device according to claim 1, wherein the identified objects are articles packed together under the predetermined condition.

11. The object identification method according to claim 6, wherein the identified objects are articles packed together under the predetermined condition.

12. The recording medium according to claim 8, wherein the identified objects are articles packed together under the predetermined condition.

13. An object identification device comprising:

a processor;

a memory having stored therein computer instructions, wherein the processor executes the instructions of:

checking a captured image against an identification image for identifying objects; and in a case where a plurality of objects are identified to be included in the captured image, determining whether or not the identified objects are articles grouped together under a predetermined condition, by using a first parameter indicating a geometric relation between a first position in a first space being an image space of the identification image and a second position corresponding to the first position in a second space, the second space representing an image space in a case where objects indicated by the identification image are articles grouped together under the predetermined condition, and a second parameter indicating a geometric relation between the first position and a third position corresponding to the first position on the captured image, wherein the second position is a position of each of the articles grouped together, and the determining whether or not the identified objects are articles grouped together further comprises calculating the second parameters for the number of the identified objects, based on a third position placed each of the identified objects, and determining whether or not the identified objects are the articles grouped together, by using the first parameters for the number of the articles grouped together and the second parameters.

14. An object identification method comprising:

checking a captured image against an identification image for identifying objects; and in a case where a plurality of objects are identified to be included in the captured image, determining whether or not the identified objects are articles grouped together under a predetermined condition, by using a first parameter indicating a geometric relation between a first position in a first space being an image space of the identification image and a second position corresponding to the first position in a second space, the second space representing an image space in a case where objects indicated by the identification image are articles grouped together under the predetermined condition, and a second parameter indicating a geometric relation between the first position and a third position corresponding to the first position on the captured image, wherein the second position is a position of each of the articles grouped together, and the method further comprises:

calculating the second parameters for the number of the identified objects, based on a third position placed each of the identified objects, and determining whether or not the identified objects are the articles grouped together, by using the first parameters for the number of the articles grouped together and the second parameters.

15. A non-transitory computer readable recording medium having a program recorded thereon, the program causing a computer to execute processing of:

checking a captured image against an identification image for identifying objects; and in a case where a plurality of objects are identified to be included in the captured image, determining whether or not the identified objects are articles grouped together under a predetermined condition, by using a first parameter indicating a geometric relation between a first position in a first space being an image space of the identification image and a second position corresponding to the first position in a second space, the second space representing an image space in a case where objects indicated by the identification image are articles grouped together under the predetermined condition, and a second parameter indicating a geometric relation between the first position and a third position corresponding to the first position on the captured image, wherein the second position is a position of each of the articles grouped together, and the determining further comprising:

calculating the second parameters for the number of the identified objects, based on a third position placed each of the identified objects, and determining whether or not the identified objects are the articles grouped together, by using the first parameters for the number of the articles grouped together and the second parameters.

* * * * *